(12) United States Patent
Carlson

(10) Patent No.: US 11,305,806 B2
(45) Date of Patent: Apr. 19, 2022

(54) VEHICLE STEERING ASSEMBLY

(71) Applicant: Great Plains Manufacturing, Inc., Salina, KS (US)

(72) Inventor: Jason Carlson, Lindsborg, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 253 days.

(21) Appl. No.: 16/540,520

(22) Filed: Aug. 14, 2019

(65) Prior Publication Data

US 2020/0055536 A1 Feb. 20, 2020

Related U.S. Application Data

(60) Provisional application No. 62/718,801, filed on Aug. 14, 2018.

(51) Int. Cl.

| | |
|---|---|
| *G05G 1/00* | (2006.01) |
| *B62D 1/12* | (2006.01) |
| *B60K 26/02* | (2006.01) |
| *B62D 11/02* | (2006.01) |
| *E02F 3/42* | (2006.01) |
| *G05G 9/00* | (2006.01) |

(Continued)

(52) U.S. Cl.
CPC ............... *B62D 1/12* (2013.01); *B60K 26/02* (2013.01); *B62D 11/001* (2013.01); *B62D 11/02* (2013.01); *E02F 3/422* (2013.01); *E02F 9/02* (2013.01); *E02F 9/2004* (2013.01); *E02F 9/2087* (2013.01); *E02F 9/225* (2013.01); *E02F 9/2253* (2013.01); *G05G 5/02* (2013.01); *G05G 5/04* (2013.01); *G05G 5/05* (2013.01); *G05G 9/00* (2013.01); *E02F 3/3414* (2013.01); *E02F 3/96* (2013.01); *E02F 9/2285* (2013.01); *G05G 2505/00* (2013.01)

(58) Field of Classification Search
CPC .............. G05G 9/047; F16H 2059/026; F16H 2059/0256; B62D 1/12
USPC .......................................................... 74/491
See application file for complete search history.

(56) References Cited

U.S. PATENT DOCUMENTS

| | | | | |
|---|---|---|---|---|
| 4,111,066 A | * | 9/1978 | Kendrick | .............. E02F 9/2004 74/471 R |
| 4,559,844 A | * | 12/1985 | Mor | ........................ G05G 9/047 137/636.3 |

(Continued)

*Primary Examiner* — Jake Cook
(74) *Attorney, Agent, or Firm* — Hovey Williams LLP; Kameron D. Kelly

(57) ABSTRACT

A vehicle steering assembly for controlling movement of a vehicle having independently rotatable left and right ground-engaging traction elements. The steering assembly comprises a steering handle coupled to the panel support structure and extending generally upwardly from the panel support structure. The steering handle comprises a laterally-extending crossmember and at least one upright extension member. The crossmember and the upright extension member are rigidly connected to one another so that shifting of the crossmember relative to the extension member is substantially prevented. The steering handle is shiftable in forward and rearward directions to thereby cause corresponding forward and rearward rotation of both of the left and right traction elements. The steering handle is rotatable in clockwise and counterclockwise directions to thereby cause a change in the relative speeds and directions of rotation of the left and right traction elements.

28 Claims, 25 Drawing Sheets

(51) Int. Cl.
*G05G 5/02* (2006.01)
*E02F 9/20* (2006.01)
*G05G 5/04* (2006.01)
*G05G 5/05* (2006.01)
*E02F 9/02* (2006.01)
*E02F 9/22* (2006.01)
*B62D 11/00* (2006.01)
*E02F 3/34* (2006.01)
*E02F 3/96* (2006.01)

(56) References Cited

U.S. PATENT DOCUMENTS

| | | | |
|---|---|---|---|
| 5,160,918 A * | 11/1992 | Saposnik | G05G 9/047 |
| | | | 273/148 B |
| 6,037,952 A | 3/2000 | Kawai | |
| 6,328,127 B1 * | 12/2001 | Hori | B62D 11/183 |
| | | | 180/333 |
| 6,460,640 B1 | 10/2002 | Keagle et al. | |
| 6,550,562 B2 | 4/2003 | Brandt et al. | |
| 6,655,229 B2 * | 12/2003 | Yamamoto | F15B 13/0422 |
| | | | 137/636.2 |
| 6,695,568 B2 | 2/2004 | Bares et al. | |
| 6,709,223 B2 | 3/2004 | Walto et al. | |
| 6,902,016 B2 | 6/2005 | Bares et al. | |
| 7,549,500 B2 | 6/2009 | Graham et al. | |
| 7,621,366 B2 | 11/2009 | Sewell | |
| 7,650,960 B2 | 1/2010 | Bock et al. | |
| D771,152 S | 11/2016 | Rush | |
| D803,273 S | 11/2017 | Sewell | |
| 9,864,396 B1 * | 1/2018 | Brown | B62D 6/08 |
| 9,970,176 B2 | 5/2018 | Azure et al. | |
| 10,114,404 B2 | 10/2018 | Kukuk et al. | |
| 10,221,540 B2 | 3/2019 | Azure | |
| 10,344,453 B2 | 7/2019 | Binstock et al. | |
| 2005/0034915 A1 * | 2/2005 | Kumazawa | B66C 13/56 |
| | | | 180/331 |

* cited by examiner

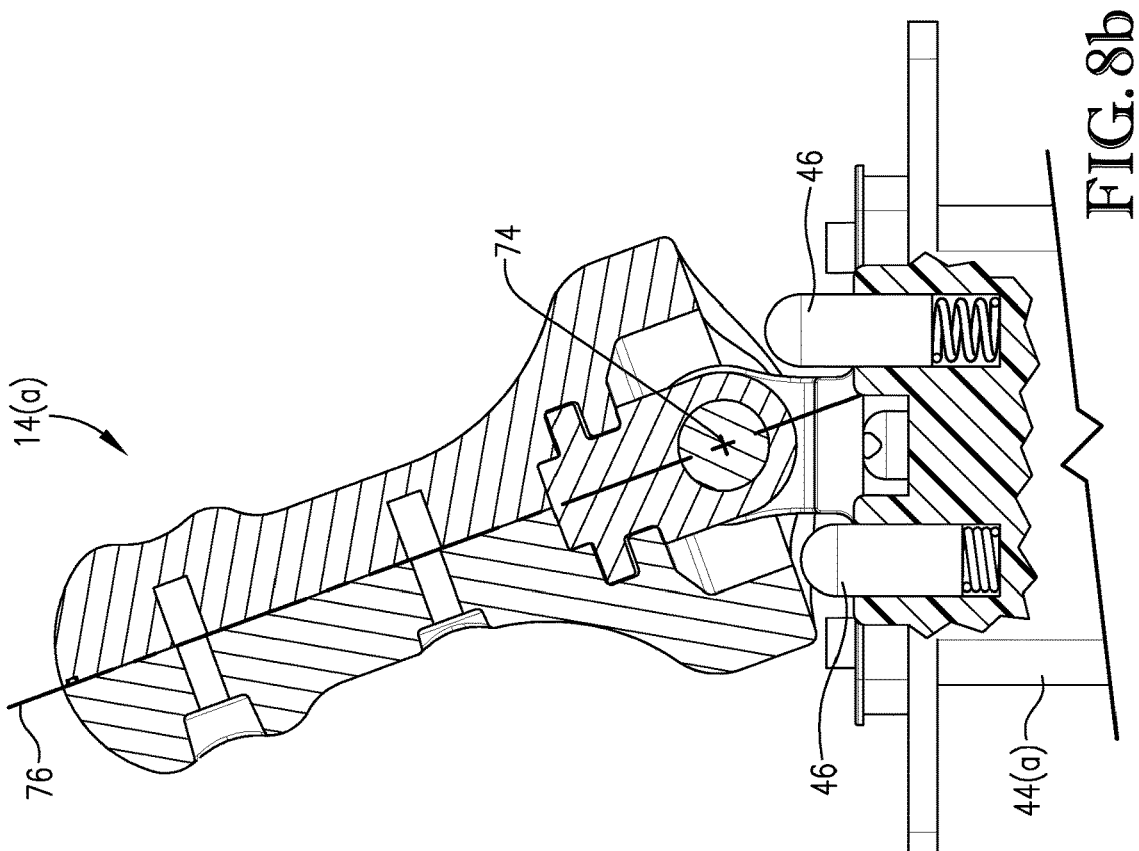
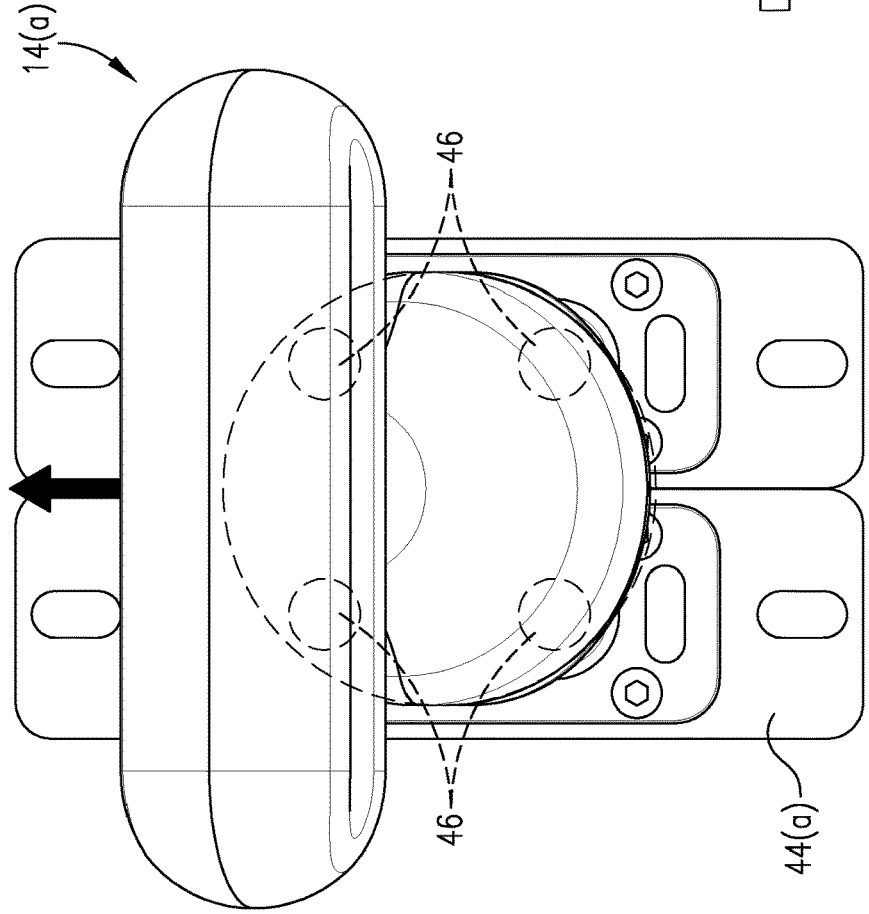

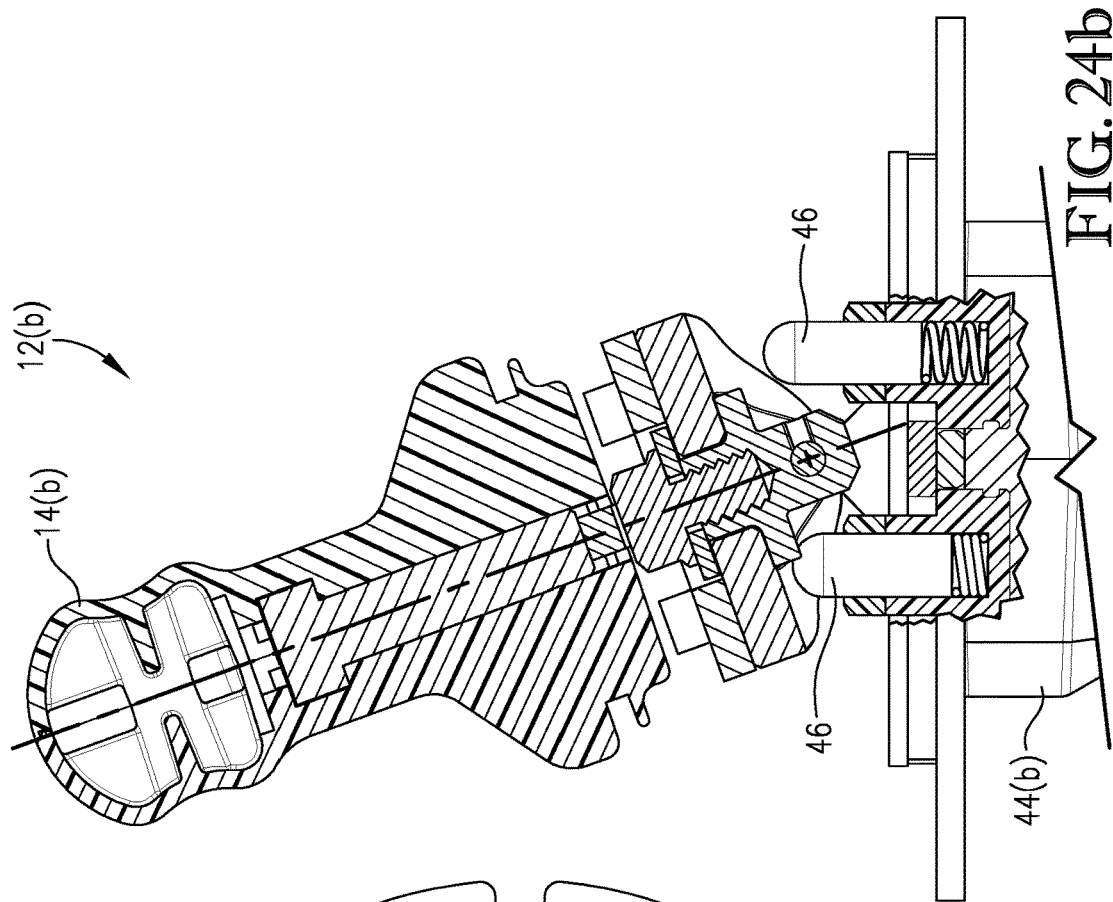
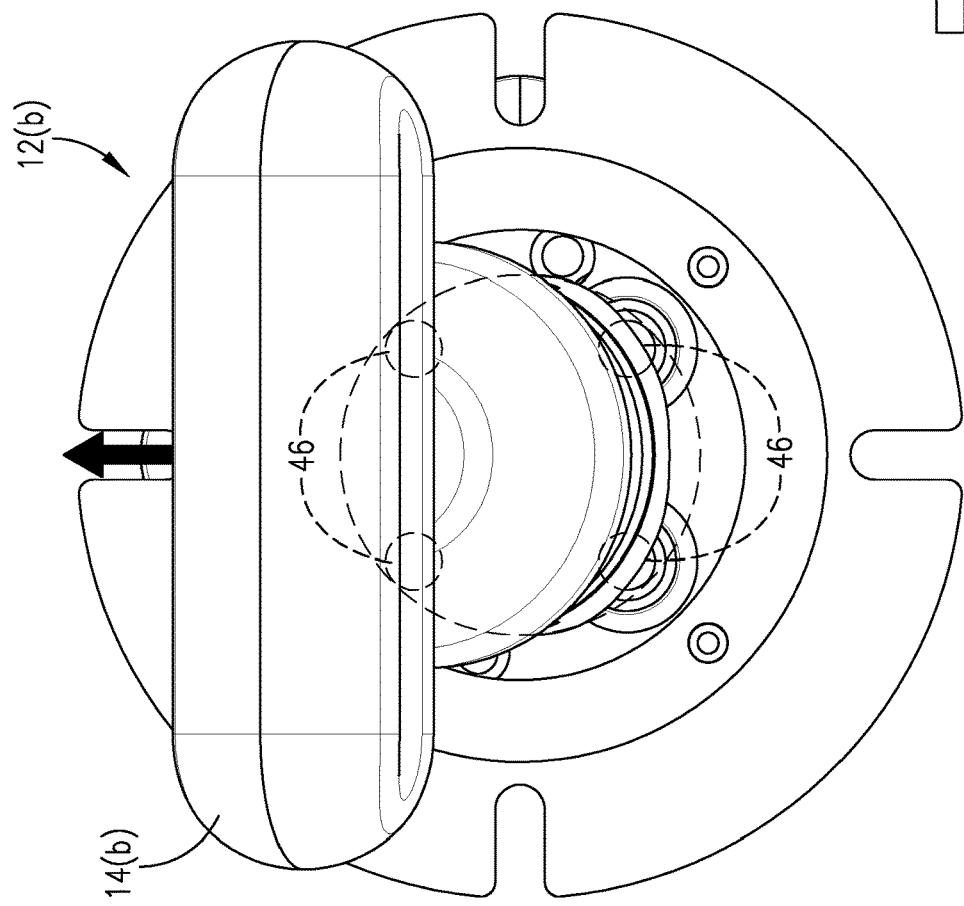
FIG. 24b
FIG. 24a

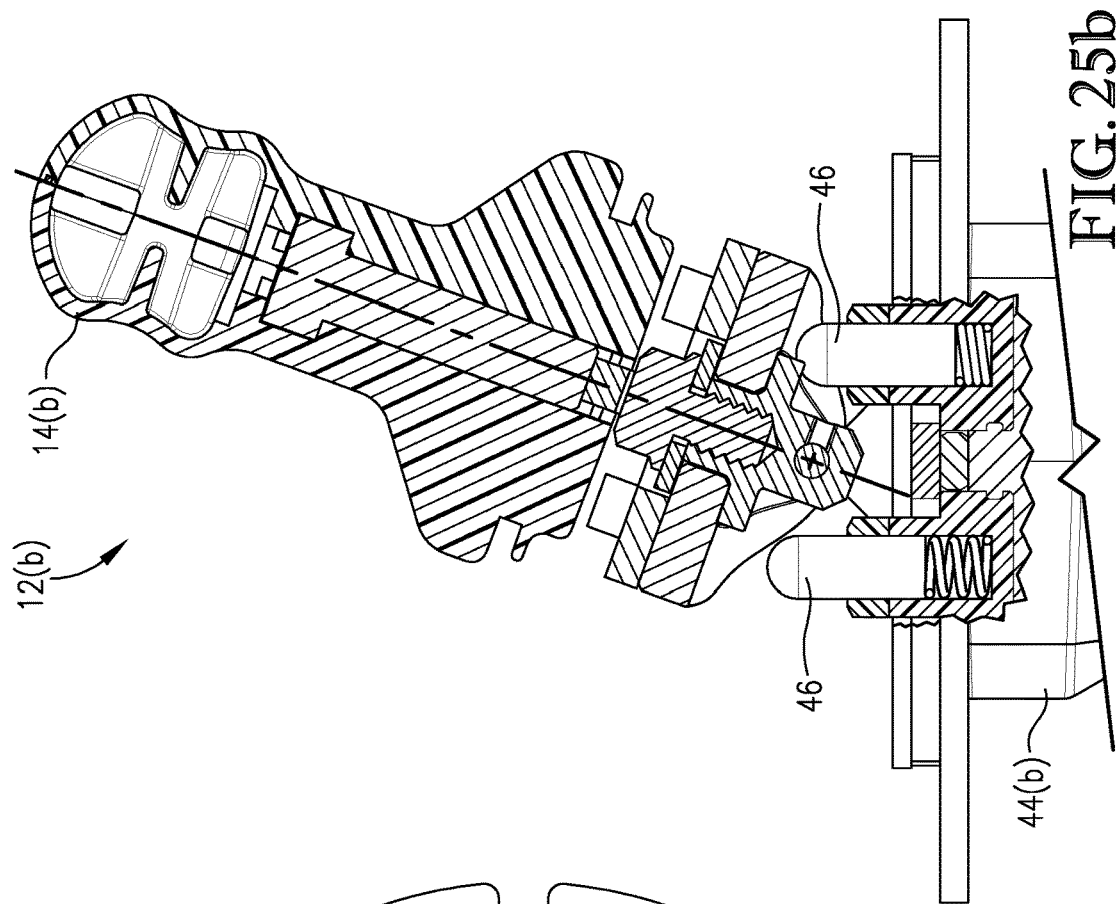
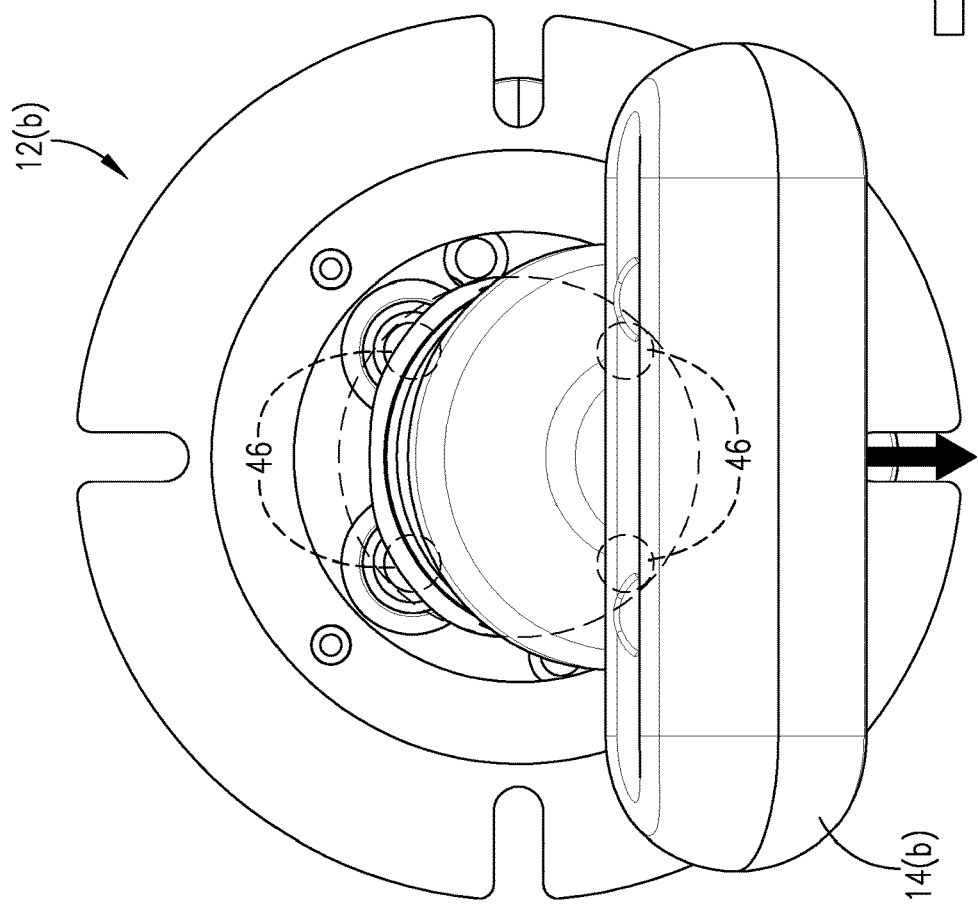

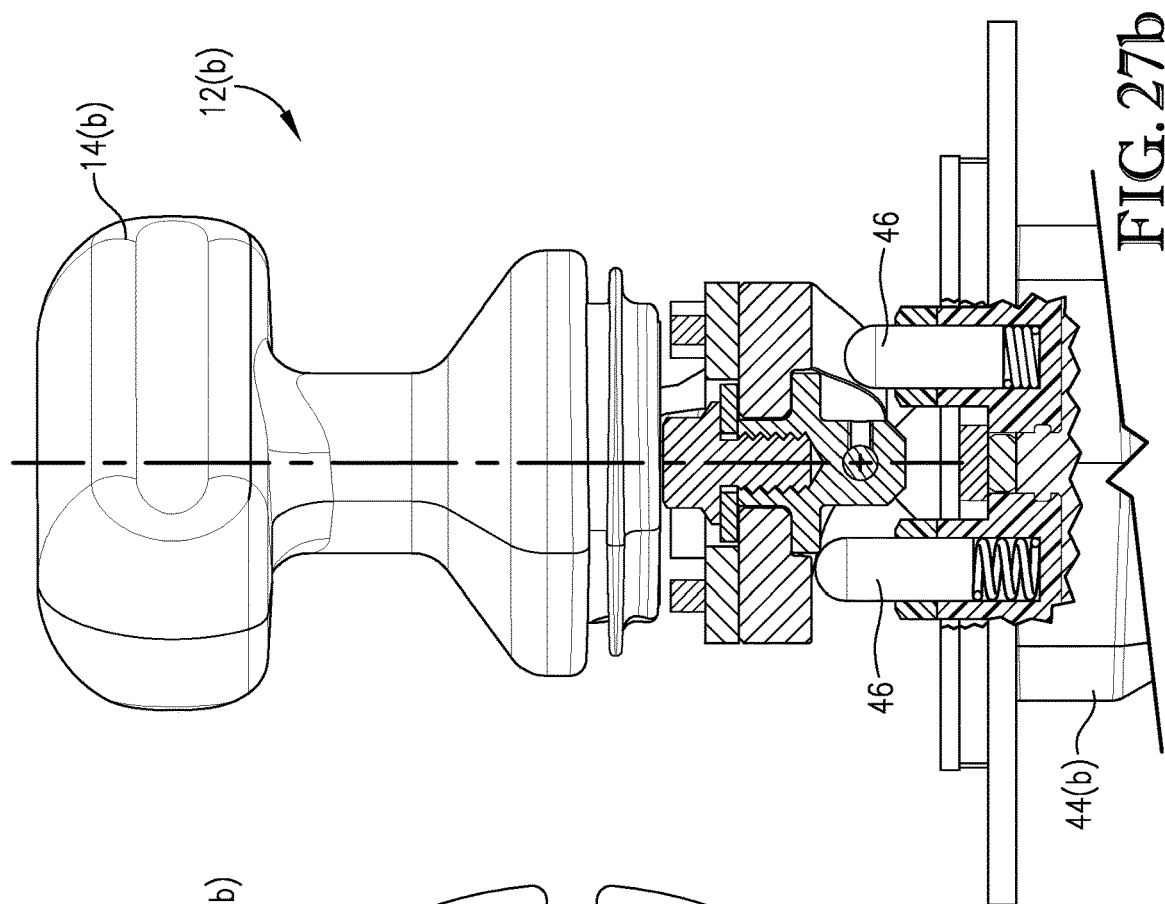
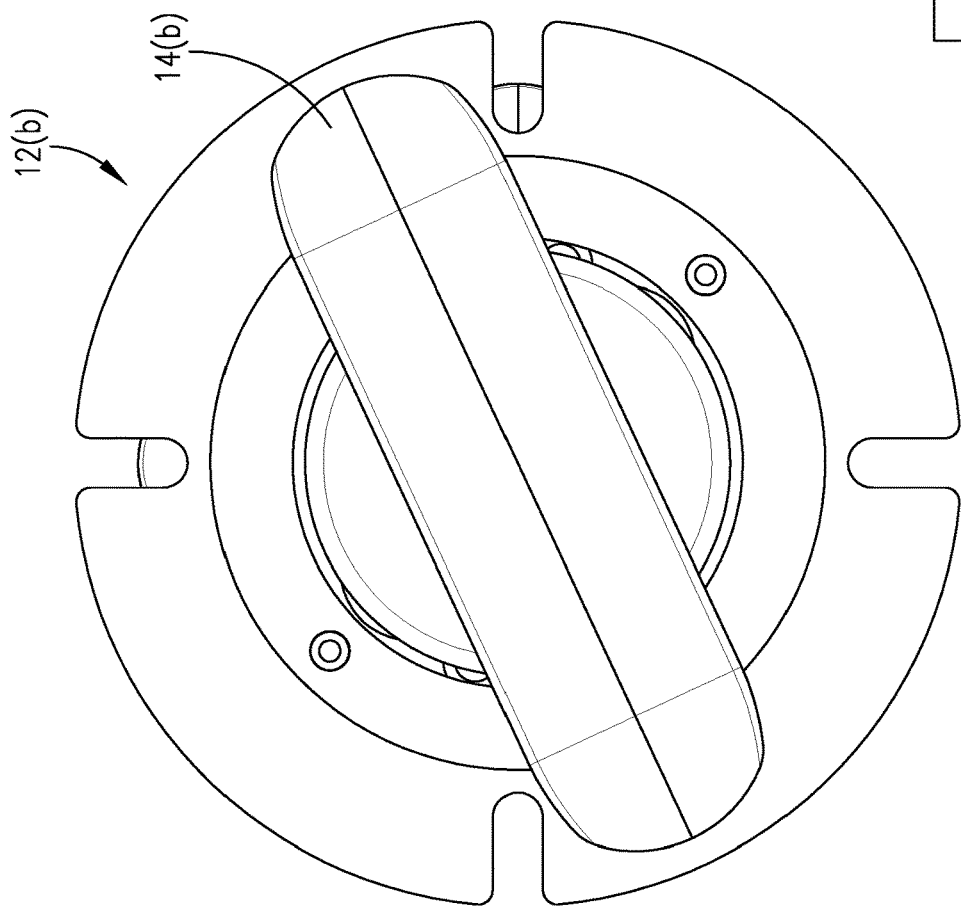
FIG. 27b
FIG. 27a

VEHICLE STEERING ASSEMBLY

CROSS-REFERENCE TO RELATED APPLICATIONS

The present non-provisional patent application claims priority to U.S. Provisional Patent Application Ser. No. 62/718,801, filed on Aug. 14, 2018, and entitled "VEHICLE STEERING ASSEMBLY," with the entirety of the above-identified, previously-filed provisional application being hereby incorporated by reference into the present non-provisional patent application.

FIELD OF THE INVENTION

Embodiments of the present invention are generally directed to a vehicle steering assembly. More particularly, embodiments of the present invention are directed to an improved vehicle steering assembly for a compact utility loader.

BACKGROUND OF THE INVENTION

Compact utility loaders are becoming popular options for operators in need of heavy equipment machines. Compact utility loaders are capable of operating a variety of different hydraulically-driven tools or attachments for performing various types of demanding work. Beneficially, however, compact utility loaders are generally manufactured with a relatively smaller size compared to other heavy equipment machines, which can be beneficial for maneuverability, transport, and storage. Unfortunately, the control systems of previously-used compact utility loaders have been difficult, non-intuitive, and burdensome to use.

Often a compact utility loader will be maneuvered by traction elements (e.g., tracks or wheels) on either side of the loader. Generally, a compact utility loader will include a separate control element (e.g., a control handle) for controlling each traction element of the loader. The need for an operator to manipulate multiple control elements to maneuver a compact utility loader can make operation of the loader overly difficult and cumbersome. This is particularly true when the operator is required to maintain a free hand to control the loader's hydraulically-driven tools. As such, there is a need for an improved vehicle steering assembly, which enhances the ability of an operator to efficiently and intuitively control a vehicle, such as compact utility loader.

SUMMARY OF THE INVENTION

In one embodiment of the present invention, there is provided a vehicle steering assembly for controlling movement of a vehicle having independently rotatable left and right ground-engaging traction elements. The vehicle comprises a control panel within reach of an operator of the vehicle. The control panel comprises a panel support structure for supporting control mechanisms of the vehicle. The steering assembly comprises a steering handle coupled to the panel support structure and extending generally upwardly from the panel support structure The steering handle comprises a laterally-extending crossmember and at least one upright extension member. The crossmember and the upright extension member are rigidly connected to one another so that shifting of the crossmember relative to the extension member is substantially prevented. The steering handle is shiftable in forward and rearward directions to thereby cause corresponding forward and rearward rotation of both of the left and right traction elements. The steering handle is rotatable in clockwise and counterclockwise directions to thereby cause a change in the relative speeds and directions of rotation of the left and right traction elements.

In another embodiment of the present invention, there is provided a vehicle steering assembly for controlling movement of a vehicle having independently rotatable left and right ground-engaging traction elements. The vehicle comprises a control panel within reach of an operator of the vehicle. The control panel comprises a panel support structure for supporting control or display mechanisms of the vehicle. The steering assembly comprises a plurality of depressible buttons coupled to the panel support structure and configured to cooperatively control the speed and direction of rotation of the left and right traction elements. The steering assembly additionally comprises a steering handle coupled to the panel support structure and positioned generally over the depressible buttons. The steering handle comprises a laterally-extending crossmember, an upright extension member, and a base. The base presents a lower surface having a curved topography. The lower surface is configured to depress the buttons in response to manipulation of the steering handle by the operator of the vehicle.

In another embodiment of the present invention, there is provided a method for controlling movement of a vehicle having independently rotatable left and right ground-engaging traction elements. The method includes a step of providing a steering handle comprising a laterally-extending crossmember and an upright extension member extending away from a control panel of the vehicle. The crossmember and the upright extension member are rigidly connected to one another so that shifting of the crossmember relative to the extension member is substantially prevented. An additional step includes shifting the steering handle in a forward direction to cause forward rotation of both of the left and right traction elements. An additional step includes shifting the steering handle in a rearward direction to cause rearward rotation of both of the left and right traction elements. A further step includes rotating the steering handle in a clockwise or counterclockwise direction to cause to cause the left and right traction elements to rotate in opposing directions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein:

FIG. 8a is a top plan view of the steering control assembly from FIG. 5, particularly showing the steering control assembly shifted in a forward position;

FIG. 8b is side elevation view of the steering control assembly from FIG. 8a, particularly showing a vertical cross section of a steering handle, a handle connection member, and a portion of a steering controller;

FIG. 13b is a perspective view of the handle connection member from FIG. 13a;

FIG. 20b is a perspective view of the horizontal cross section of the steering control assembly from FIG. 20a;

FIG. 24a is a top plan view of the steering control assembly from FIG. 16, particularly showing the steering control assembly shifted in a forward position;

FIG. 24b is side elevation view of the steering control assembly from FIG. 24a, particularly showing a vertical cross section of a steering handle, a handle connection assembly, and a portion of a steering controller;

FIG. 25a is a top plan view of the steering control assembly from FIG. 26, particularly showing the steering control assembly shifted in a rearward position;

FIG. 25b is side elevation view of the steering control assembly from FIG. 25a, particularly showing a vertical cross section of a steering handle, a handle connection assembly, and a portion of a steering controller;

FIG. 27a is a top plan view of the steering control assembly from FIG. 16, particularly showing the steering control assembly rotated in a counterclockwise position;

FIG. 27b is side elevation view of the steering control assembly from FIG. 27a, particularly showing a vertical cross section of a steering handle, a handle connection assembly, and a portion of a steering controller;

FIG. 28b is side elevation schematic view of the steering control assembly from FIG. 28a.

Figure 1:
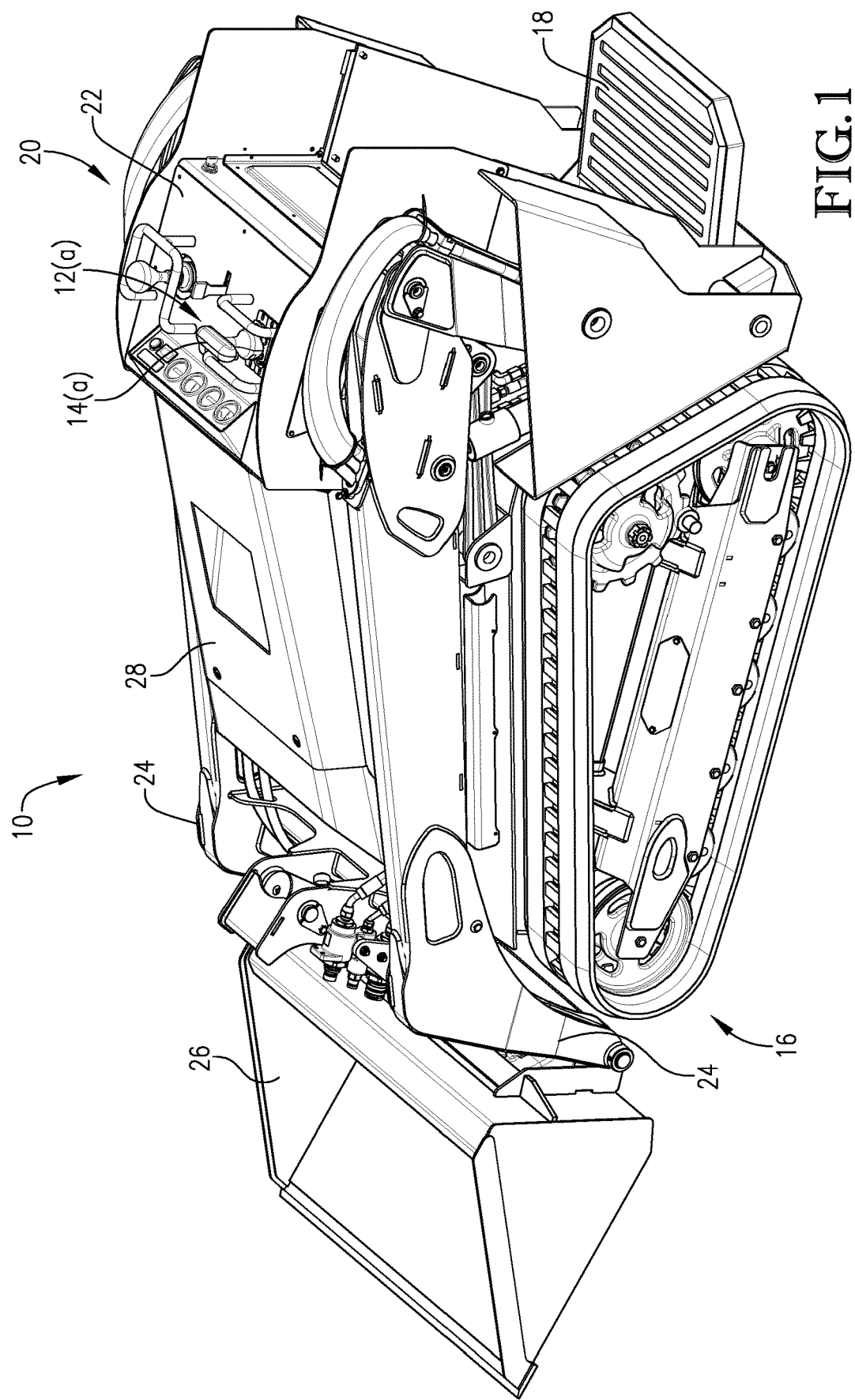
FIG. 1 is a left perspective view of a vehicle, in the form of a compact utility loader, with a steering control assembly according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
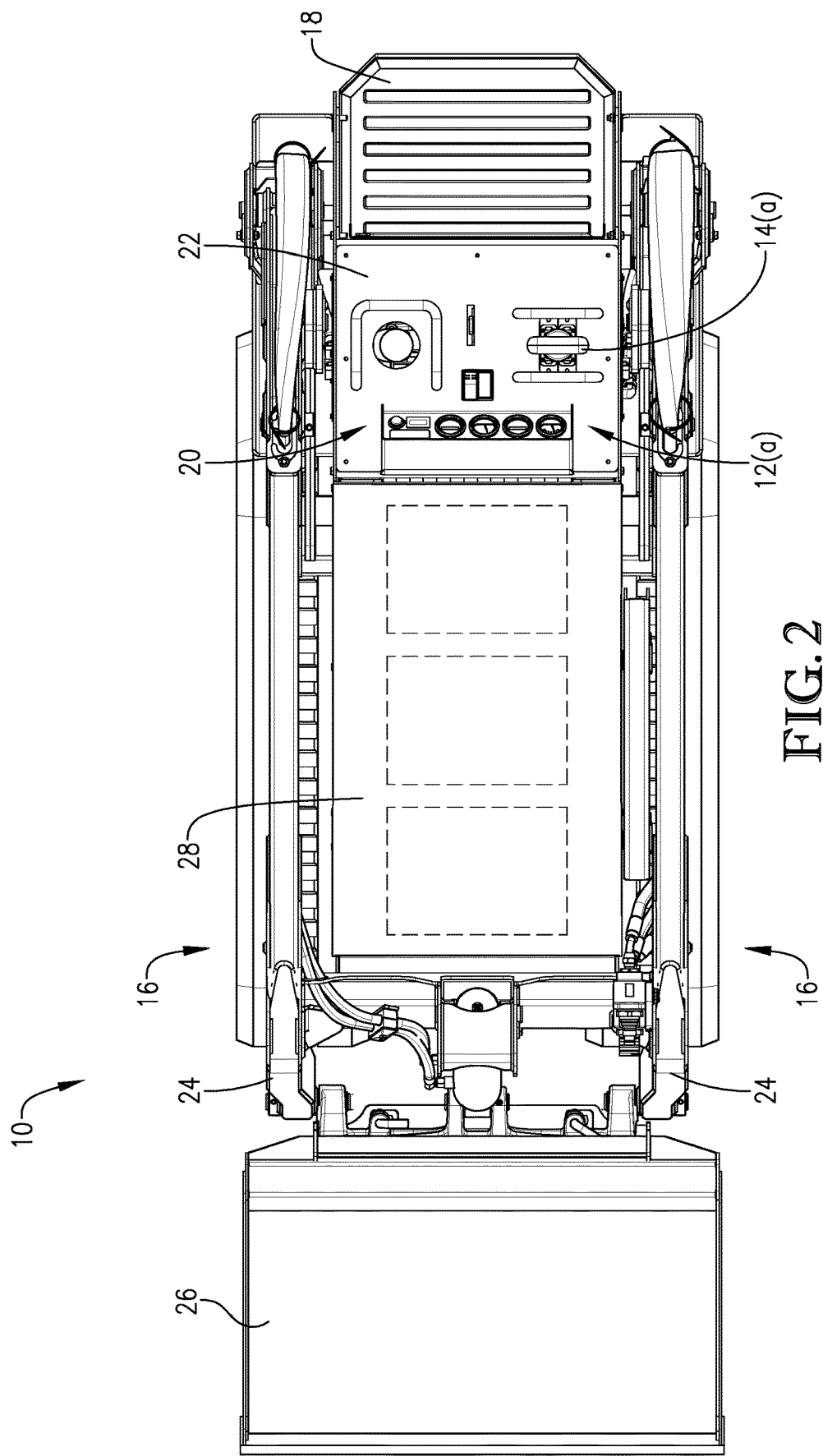
FIG. 2 is a top plan view of the compact utility loader of FIG. 1.

Broadly, embodiments of the present invention are directed to a steering control assembly for a vehicle, such as for a compact utility loader. FIGS. 1 and 2 show a vehicle in the form of a compact utility loader 10 (hereinafter "loader 10") equipped with a steering control assembly 12(a) that includes an improved steering handle 14(a). The steering handle 14(a) controls movement of the loader 10. Movement of the loader 10 is provided by independently rotatable left and right traction elements 16 (e.g., left and right endless tracks).

As shown in FIGS. 1 and 2, the loader 10 may include an operator platform 18 on which the operator stands while operating the loader 10. The loader 10 has a control panel 20 within reach and view of the operator. The control panel 20 includes a panel support structure 22 to which the steering control assembly 12(a) is connected. The loader 10 also includes a pair of lift arms 24 to which a working attachment 26 (e.g., a loader bucket) is connected.

The loader 10 includes a power source (not shown), such as a diesel engine positioned below a hood 28 of the loader 10, for powering the loader's 10 drive system and loader system. In certain embodiments, the power source can be a turbocharged diesel engine of less than 25 horsepower. Preferably, the power source has more than 20 horsepower. The drive system includes the loader's 10 drive train (e.g., hydraulic motors and/or a hydrostatic transmission) and the left and right traction elements 16 (e.g., tracks). The loader system includes the loader's 10 lift arms 24 and the working attachment 26 (e.g., loader bucket).

Although FIGS. 1 and 2 show a compact utility loader 10 with traction elements 16 in the form of endless tracks, the loader 10 can be any type of vehicle having independently rotatable left and right traction elements 16 (e.g., tracks or wheels), such as, for example, a skid steer loader, an excavator, a tractor, or a bulldozer.

Although FIGS. 1 and 2 show the working attachment 26 in the form of a loader bucket connected to the end of the lift arms 24, the working attachment 26 could be selected from a variety of different useful tools, such as, for example, a trencher, a tiller, a posthole digger, a mower, a fork lift, a grapple rake, a hydraulic breaker, a snow thrower, a box rake, a stump grinder, a utility blade, or a trench filler.

Figure 3:
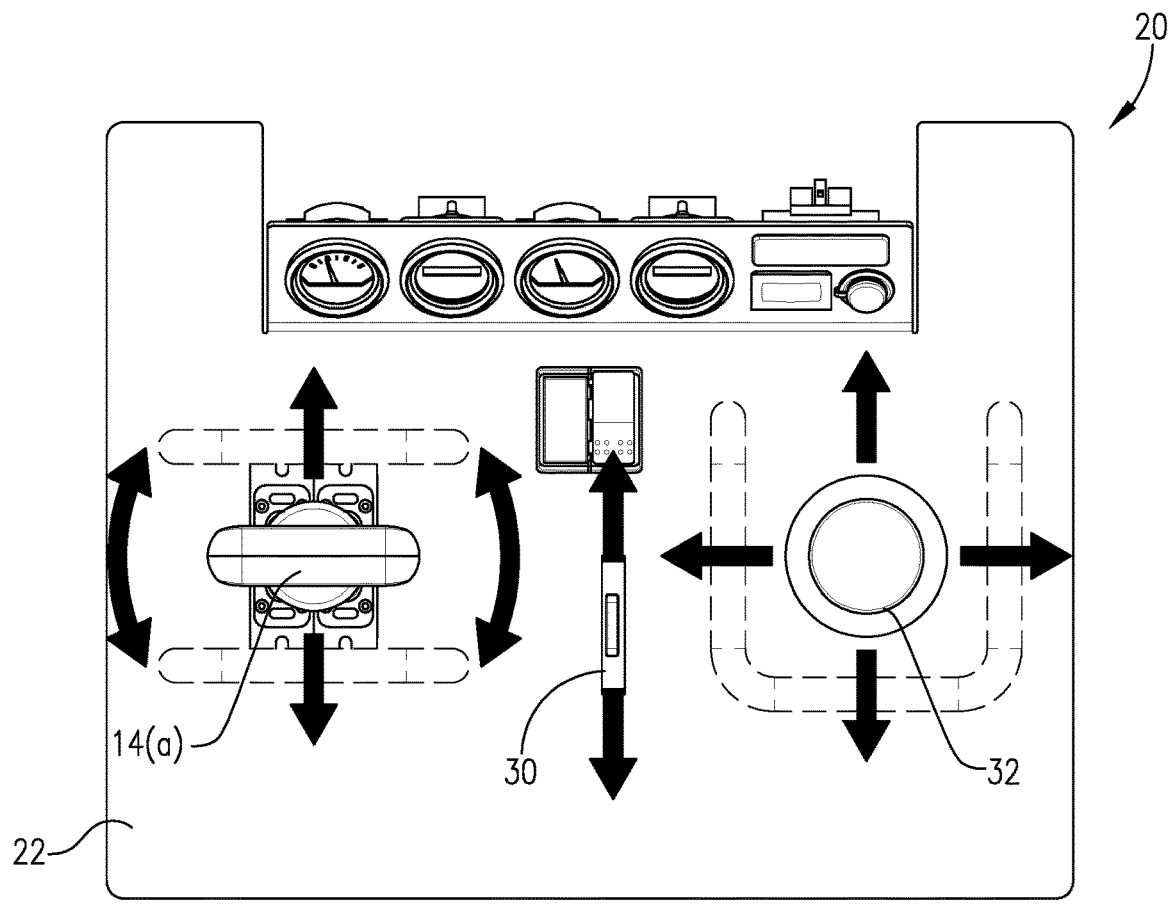
FIG. 3 is a top plan view of a control panel from the compact utility loader of FIGS. 1 and 2.

Turning to FIG. 3 a top view of the loader's 10 control panel 20 is shown, illustrating that the control panel 20 can include an information portion, such as gauges, graphic displays, and the like, which provides visual information to the operator. The control panel 20 can additionally include a control portion, which can be manually manipulated by the operator to control the loader 10. The control portion of the control panel 20 can include switches, the steering handle 14(a), a throttle handle 30, and a loader handle 32.

As illustrated by the arrows in FIG. 3, the steering handle 14(a), the throttle handle 30, and the loader handle 32 can be manually manipulated in various directions to control movement and speed of various portions of the loader 10. In particular, the steering handle 14(a) can be manually manipulated forwardly and rearwardly and can be manually twisted in clockwise and counterclockwise directions to control the speed and direction of rotation of the left and right traction elements 16. As used herein, the terms "forward" or "forwardly" refer to a direction towards a front of the loader 10, such as where the working attachment 26 is connected to the loader 10. The terms "rearward" or "rearwardly" refer to a direction towards a back of the loader 10, such as where the operator stands on the operator platform 18 to operate the loader 10. The terms "right" and "left" means a right direction and a left direction, respectively, when viewing forwardly from the back of the loader 10. The terms "clockwise" and "counterclockwise" means a clockwise direction and a counterclockwise direction, respectively, when looking down on the applicable component from above the component. Thus, with respect to the view of the control panel 20 on FIG. 2, a forward direction is toward the left side of the figure, a rearward direction is toward the right side of the figure, a left direction is toward the bottom side of the figure, a right direction is toward the top side of the figure, a clockwise direction is clockwise (as looking down on the loader 10), and a counter-clockwise direction is counter-clockwise (as looking down on the loader 10).

Figure 4:
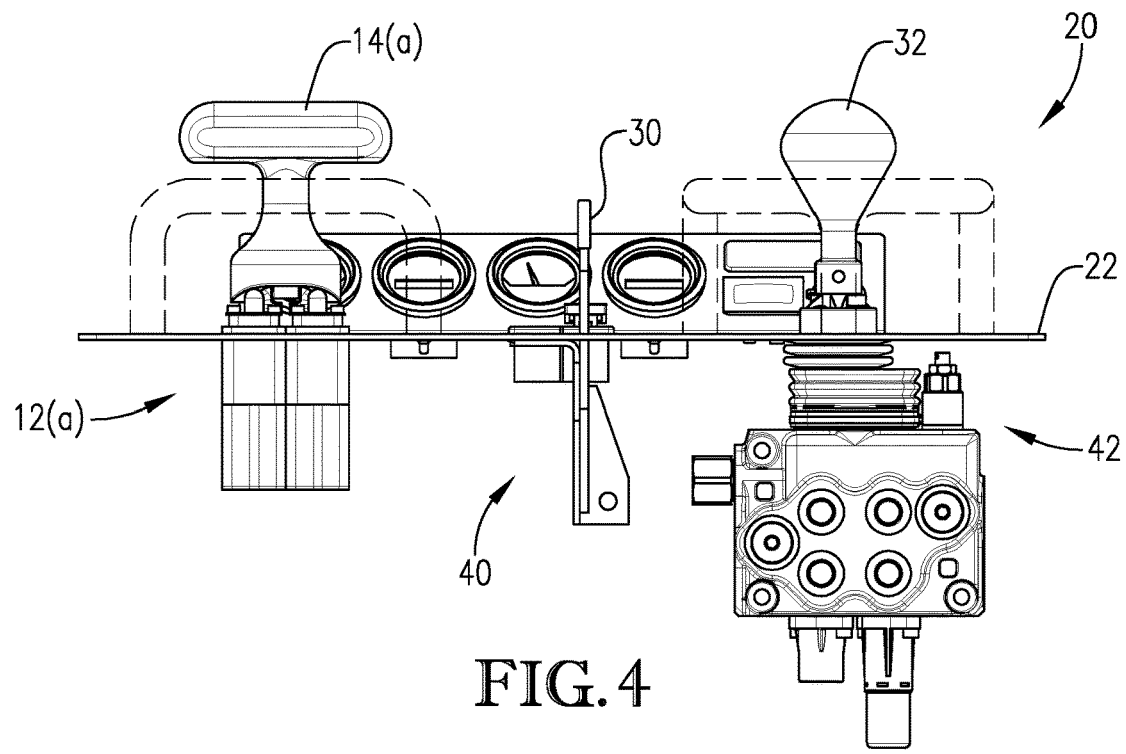
FIG. 4 is a rear elevation view of the control panel from FIG. 3.

FIG. 4 is a vertical view from the rear of the panel support structure 22 of the control panel 20, with the panel support structure shown supporting the steering control assembly 12(a), a throttle control assembly 40, and a lift control assembly 42. The steering, throttle, and lift control assemblies 12(a), 40, and 42 include manually movable handles (i.e., steering handle 14(a), throttle handle 30, and lift handle 32, respectively) each being connected to a controller. The handles 14(a), 30, 32 extending generally above the panel support structure 22 and the corresponding controllers extending generally below the panel support structure 22. Each controller is rigidly coupled to the panel support structure 22 and each handle 14(a), 30, 32 is shiftable relative to the controller to which it is coupled. In some embodiments, the controllers may be secured to the panel support structure 22 in a manner that permits an upper portion of the controllers (e.g., depressible buttons disclosed in more detail below) to extend upward above the panel support structure 22. Although not shown in the drawing, a protective cover (e.g., flexible boot) can be attached to the shaft of each handle 14(a), 30, 32 to prevent dust and debris from entering the controllers at the base of the shaft.

Figure 5:
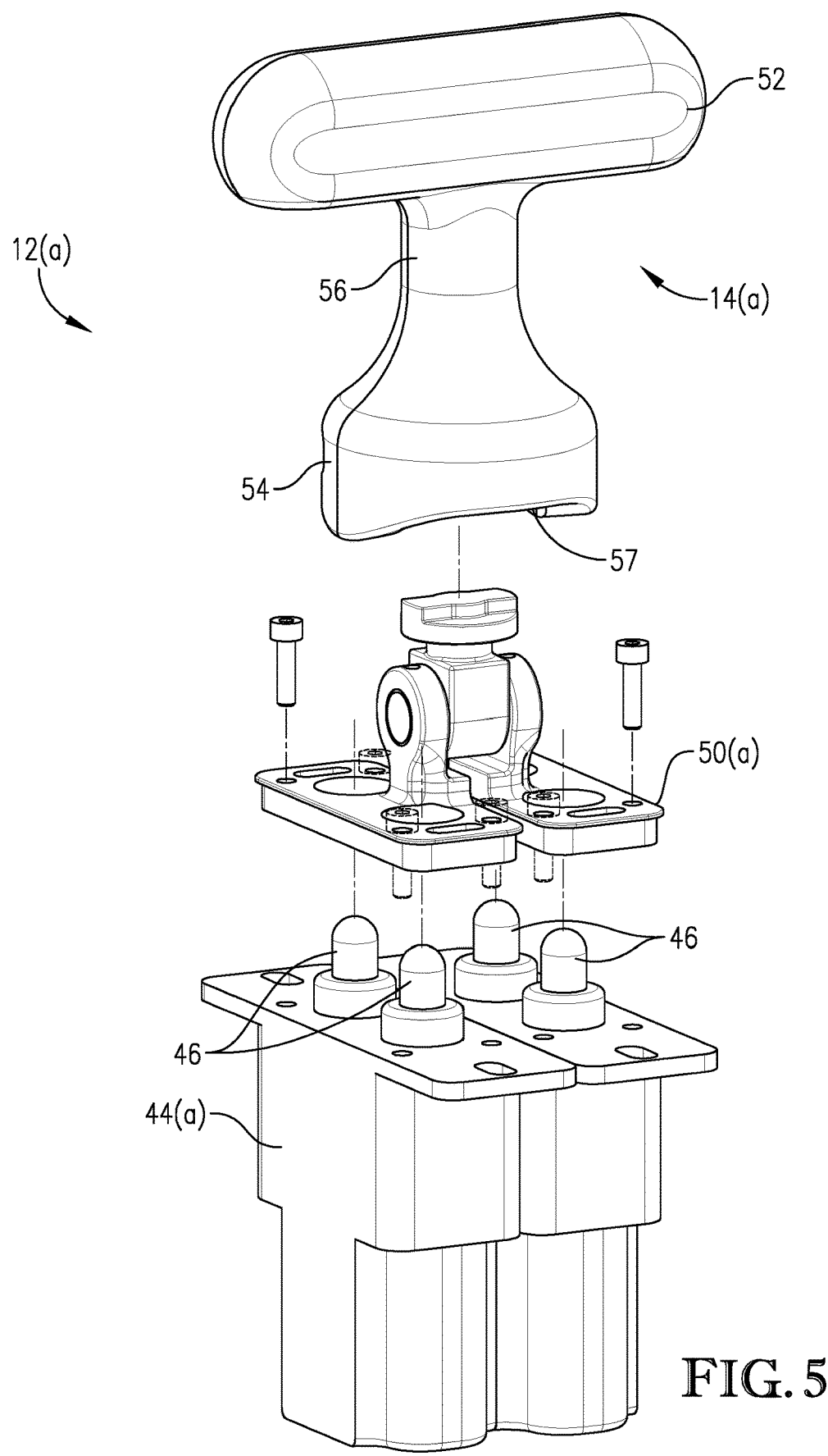
FIG. 5 is an exploded view of a steering control assembly from the control panel from FIGS. 3 and 4.

FIG. 5 is an exploded view of the steering control assembly 12(a). As shown in FIG. 5, the controller of the steering control assembly 12(a) is a steering controller 44(a), which in certain embodiments may be a hydraulic pilot control valve in communication with the loader's 10 drive train (e.g., hydraulic motors and/or a hydrostatic transmission). The steering controller 44(a) is equipped with four depressible buttons 46 that cooperatively control the speed and direction of rotation of the loader's 10 traction elements 16 (e.g., tracks or wheels) via communication between the steering controller 44(a) and the loader's 10 drive train (e.g., hydraulic motors and/or a hydrostatic transmission). A front left button 46 may control the forward direction of the left the traction element 16, while a rear left button 46 may control the rearward direction of the left the traction element 16. In some embodiments, the rear left button 46 will be position behind the front left button 46. Similarly, a front right button 46 may control the forward direction of the right the traction element 16, while a rear right button 46 may control the rearward direction of the right the traction element 16. In some embodiments, the rear right button 46 may be position behind the front right button 46. In addition, the front right and the rear right buttons 46 may be positioned, respectively, to the right of the front left and the rear left buttons 46. The steering handle 14(*a*) is coupled to the steering controller 44(*a*) and is used to depress the buttons 46 in a manner that, as will be described in more detail below, allows for simple and intuitive control of the movement of the loader.

Remaining with FIG. 5, the steering control assembly 12(*a*) includes a handle securement structure 50(*a*) that is used to connect the steering handle 14(*a*) to the steering controller 44(*a*) in a manner that allows the steering handle 14(*a*) to be shifted forward, shifted rearward, rotated clockwise, and rotated counterclockwise relative to the steering controller 44(*a*), as described in more detail below. In some embodiments, the handle securement structure 50(*a*) will be rigidly secured to the steering controller 44(*a*) via a plurality of threaded fasteners that extend down through both the handle securement structure 50(*a*) and the steering controller 44(*a*). The steering controller 44(*a*) may itself be rigidly secured to the panel support structure 22 via a plurality of threaded fasteners that extend down through both the panel support structure 22 and the steering controller 44(*a*).

The steering handle 14(*a*) may include an upper crossmember 52, a lower base 54, and an upright extension member 56 extending between the base 54 and the crossmember 52. The crossmember 52 and the upright extension member 56 can be connected in a generally T-shaped configuration. In some embodiments, the crossmember 52 and the upright extension member 56 may be rigidly connected to one another so that shifting of the crossmember 52 relative to the upright extension member 56 is substantially (or completely) prevented. Furthermore, in some embodiments, the steering control assembly 12(*a*) will be connected to the panel support structure 22 in such a manner that the crossmember 52 is substantially (or completely) prevented from lateral shifting relative to the panel support structure 22. In such embodiments, for instance, only forward, rearward, and rotating movements of the steering handle 14(*a*) relative to the panel support structure 22 will be permitted.

A bottom of the base 54 may presents a curved lower or bottom surface 57 that is configured to contact the depressible buttons 46 and selectively depress the buttons 46 as the steering handle 14(*a*) is manually manipulated. In some such embodiments, the crossmember 52, the upright extension member 56, and the base 54 will be integrally formed from a unitary piece of material.

Although the crossmember 52 of the steering handle 14(*a*) is depicted herein as being a substantially straight elongated member that is connected to the top of the upright extension member 56 to form a T-shape configuration, it should be understood that the crossmember 52 can take on a variety of shapes for facilitating manual grasping by the operator of the loader 10. For example, the crossmember 52 can have an irregular ergonomic shape that conforms to the hand of the operator. In certain specific embodiments, the steering handle 14(*a*) will only include a single upright extension member 56.

Figure 6:
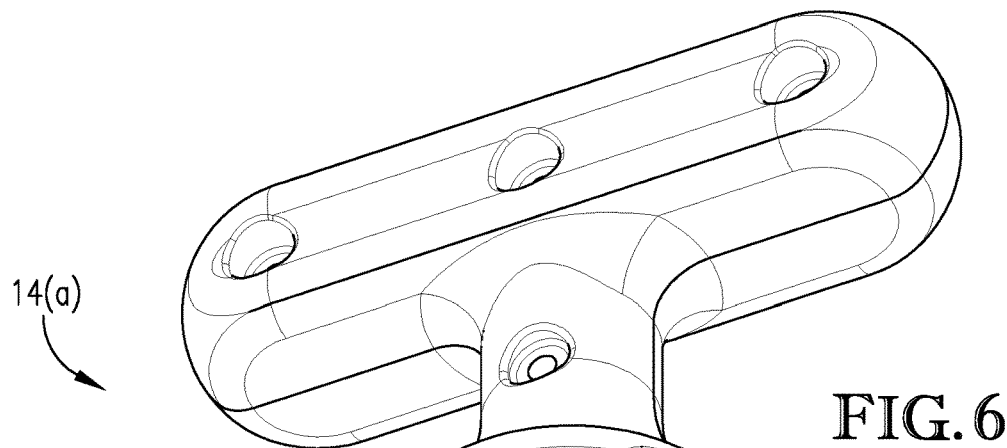
FIG. 6 is a steering handle and a handle connection member from the steering control assembly from FIG. 5.

FIG. 6 shows the bottom of the steering handle 14(*a*) in more detail. In particular, FIG. 6 shows that the curved bottom surface 57 of the base 54 includes a curved topography with a substantially flat front section 60, a substantially flat rear section 62, a pair of left-side downwardly sloping sections 64, and a pair of right-side downwardly sloping sections 66. The left-side downwardly sloping sections 64 are formed on the sides of a left downward projection 68 of the base 54. It should be understood that the left downward projection 68 extends down below the front and rear sections 60, 62. The right-side downwardly sloping sections 66 are formed on the sides of a right downward projection 69 of the base 54. It should be understood that the right downward projection 69 extends down below the front and rear sections 60, 62.

FIG. 6, also shows that the base 54 includes an internal opening within which a handle connection member 70(*a*) is received. The handle connection member 70(*a*) is used to connect the steering handle 14(*a*) with the steering controller 44(*a*) in a manner that allows the steering handle 14(*a*) to be shifted forward, shifted rearward, rotated clockwise, and rotated counterclockwise relative to the steering controller 44(*a*), as described in more detail below.

Figure 7A:
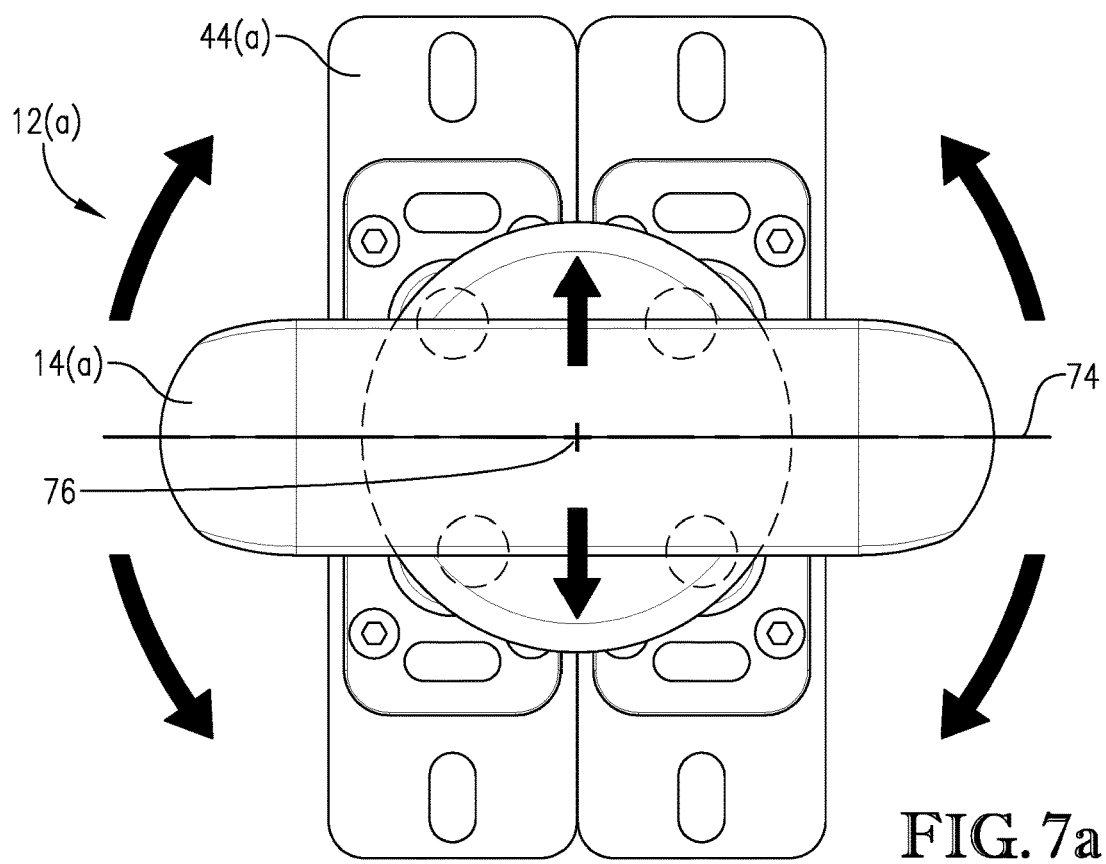
FIG. 7a is a top plan view of the steering control assembly from FIG. 5, particularly showing the steering control assembly in a neutral position.

FIGS. 7*a* (top view) and 7*b* (side view) show the steering control assembly 12(*a*) in a neutral position. When the steering control assembly 12(*a*) is in the neutral position, none of the depressible buttons 46 are depressed enough to cause rotation of the right or left traction elements 16 of the loader 10. The steering control assembly 12(*a*) is biased toward this neutral position so that if the operator of the loader 10 releases a hand grip on the steering handle 14(*a*), the loader 10 stops.

Figure 7B:
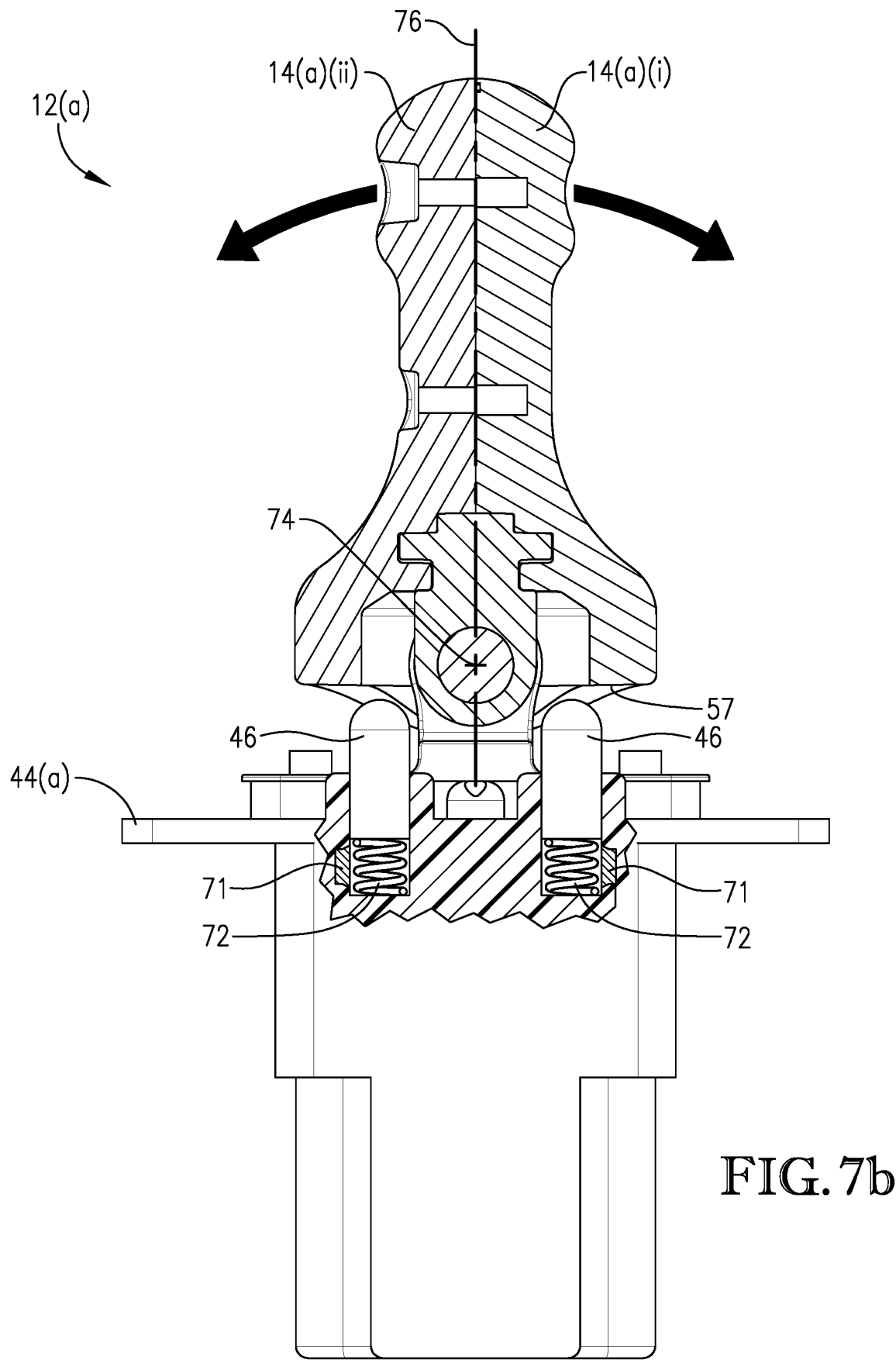
FIG. 7b is side elevation view of the steering control assembly from FIG. 7a, particularly showing a vertical cross section of a steering handle, a handle connection member, and a portion of a steering controller.

As illustrated by FIG. 7*b*, the steering controller 44(*a*) includes, for each depressible button 46, a variable switch 71 (or pilot valve spool) and a biasing mechanism 72 for biasing the depressible buttons 46 upwardly. The variable switch 71 may comprise a position sensor that measures the depth of depression of the depressible button 46 and permits the speed of rotation of the traction elements 16 to be controlled in a manner that is proportional to the depth of depression of the depressible button 46. In some embodiments, as noted above, the steering controller 44(*a*) may be a hydraulic pilot control valve and movement of the depressible buttons 46 directly adjusts the flow or pressure of hydraulic fluid through the control valve. For example, each of the depressible buttons 46 may activate an associated variable switch 71 and/or may move an associated spool in the steering controller 44(*a*) when the depressible button 46 is depressed. Such actuation of the variable switch 71 and/or the spool will generate (or change) a pilot pressure signal that is sent from the steering controller 44(*a*) to the loader's 10 drive train (e.g., the hydrostatic transmission that controls the hydraulic motors). The pilot pressure signal sent to the loader's 10 drive train will be based on the depth at which the depressible button 46 is depressed. As such, when the depressible button 46 is fully depressed, a pilot pressure signal is sent to the loader's 10 drive train (e.g., to the hydrostatic transmission) to cause the associated traction element 16 to be rotated at a maximum rate. If the depressible button 46 is depressed a lesser amount (i.e., less than a full depression), a pilot pressure signal is sent to the loader's 10 drive train (e.g., to the hydrostatic transmission) to cause the associated traction element 16 to be rotated at a rate that is less than the maximum rate. It is further understood that one depressible button 46 (e.g., the front left button 46) is used to generate a pilot control signal that causes the left traction element 16 to rotate in a forward direction, while another depressible button 46 (e.g., the rear left button 46) is used to generate a pilot control signal that causes the left traction element 16 to rotate in a rearward direction. Similarly, one depressible button 46 (e.g., the front right button 46) is used to generate a pilot control signal that causes the right traction element 16 to rotate in a forward direction, while another depressible button 46 (e.g., the rear right button 46) is used to generate a pilot control signal that causes the right traction element 16 to rotate in a rearward direction.

The biasing mechanism 72 associated with each depressible button 46 pushes the button 46 up against the bottom surface 57 of the steering handle 14(a). When the steering handle 14(a) is not being manually manipulated out of the neutral position, all the depressible buttons are fully extended and the steering handle 14(a) is maintained in the neutral position by the depressible buttons 46 pushing up against the substantially flat front and rear sections 60, 62 of the curved bottom surface 57 of the base 54.

FIGS. 7a and 7b show that the steering handle 14(a) is connected to the steering controller 44(a) in a manner that allows the steering handle 14(a) to be shifted/tilted forward and rearward on a tilt axis 74. Further, the steering handle 14(a) is connected to the steering controller 44(a) in manner that allows the steering handle 14(a) to be rotated/twisted clockwise and counterclockwise on a twist axis 76. The tilt axis 74 and twist axis 76 are maintained substantially perpendicular to one another, even during shifting or rotating of the steering handle 14(a).

As shown in FIGS. 8a (top view) and 8b (side view), shifting the steering handle 14(a) forward on the tilt axis 74 (See FIG. 8b), without rotating the steering handle 14(a) on the twist axis 76 (See FIG. 8b), depresses the front left and right depressible buttons 46. When the front left and right depressible buttons 46 are depressed an equal amount, as shown in FIGS. 8a and 8b, the left and right traction elements 16 rotate forward at substantially the same speed, so the loader 10 travels straight forward. It should be understood that the further the front left and right depressible buttons 46 are depressed the faster the left and right traction elements 16 will rotate so as to increase the speed of the loader 10. As such, when the steering handle 14(a) is shifted fully forward, the left and right front depressible buttons 46 will be depressed a maximum amount, and the left and right traction elements 16 will rotate forwardly at a maximum rate to cause the loader to drive forward at a maximum speed.

Figure 9B:
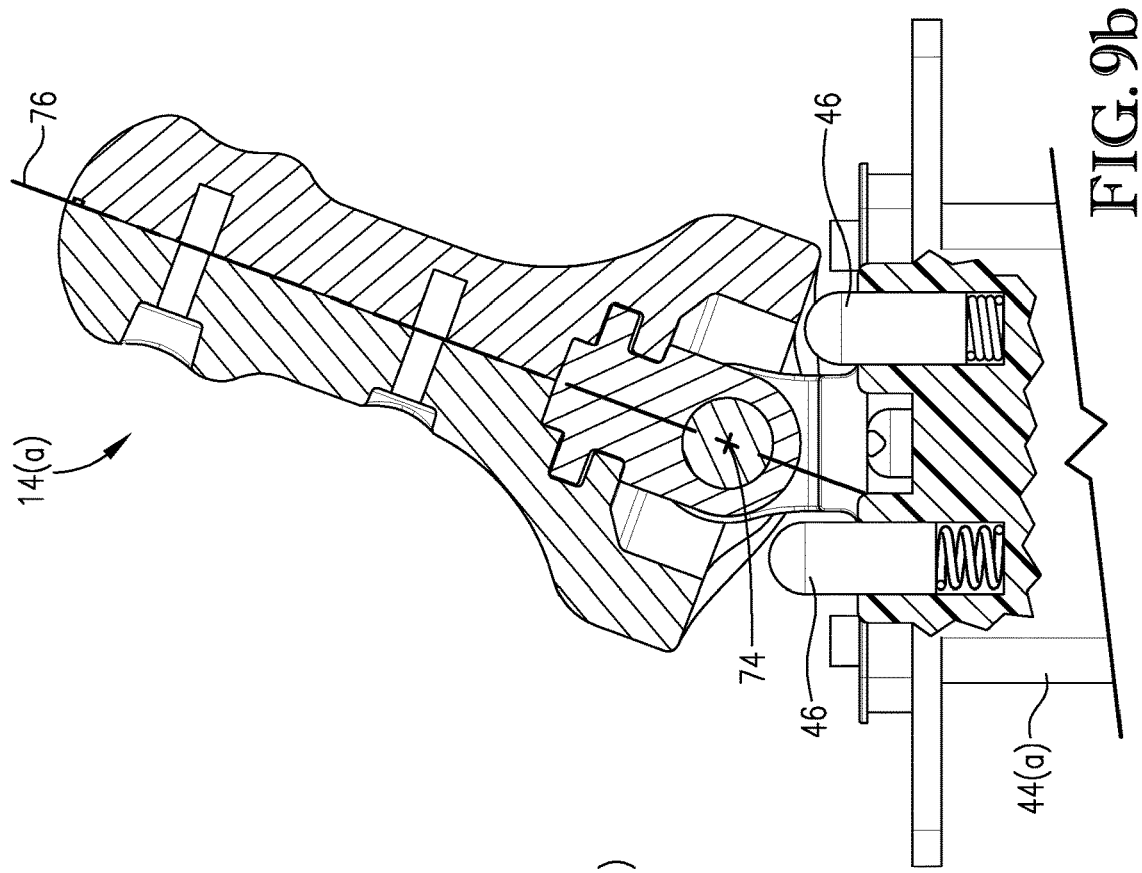
FIG. 9b is side elevation view of the steering control assembly from FIG. 9a, particularly showing a vertical cross section of a steering handle, a handle connection member, and a portion of a steering controller.
Figure 9A:
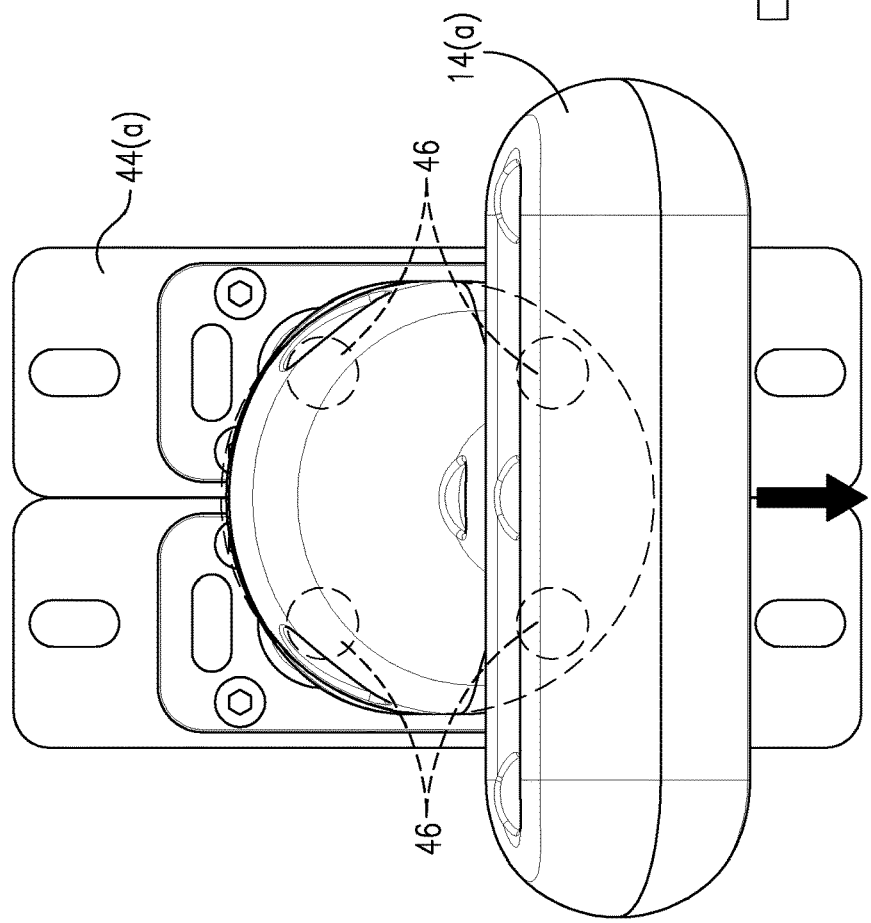
FIG. 9a is a top plan view of the steering control assembly from FIG. 5, particularly showing the steering control assembly shifted in a rearward position.

As shown in FIGS. 9a (top view) and 9b (side view), shifting the steering handle 14(a) rearward on the tilt axis 74, without rotating the steering handle 14(a) on the twist axis 76, depresses the rear left and right depressible buttons 46. When the rear left and right depressible 46 buttons are depressed an equal amount, as shown in FIGS. 9a and 9b, the left and right traction elements 16 rotate reward at substantially the same speed, so the loader 10 travels straight backward (i.e., in reverse). It should be understood that the further the rear left and right depressible buttons 46 are depressed the faster the left and right traction elements 16 will rotate so as to increase the speed of the loader 10. As such, when the steering handle 14(a) is shifted fully rearward, the left and right rear depressible buttons 46 will be depressed a maximum amount, and the left and right traction elements 16 will rotate rearwardly at a maximum rate to cause the loader to drive backward at a maximum speed.

Figure 10B:
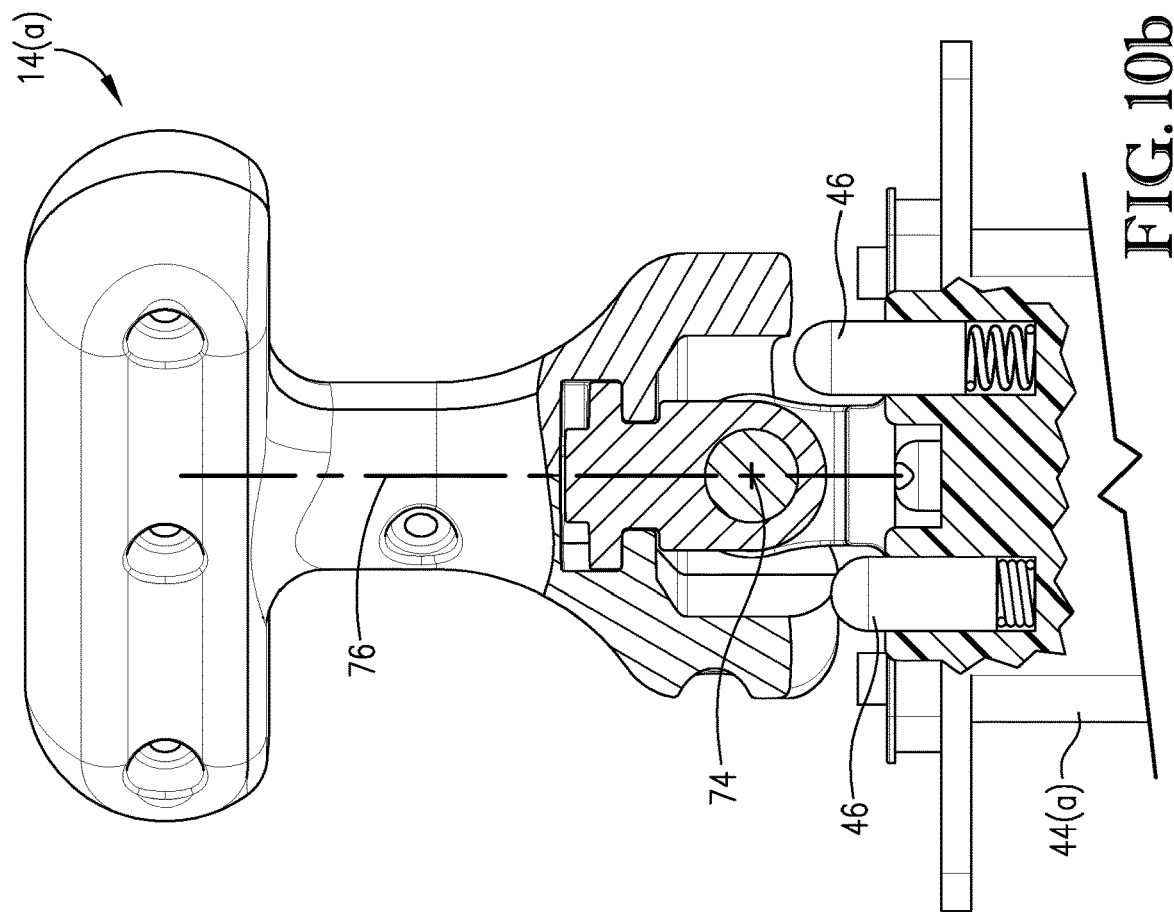
FIG. 10b is side elevation view of the steering control assembly from FIG. 10a, particularly showing a vertical cross section of a steering handle, a handle connection member, and a portion of a steering controller.
Figure 10A:
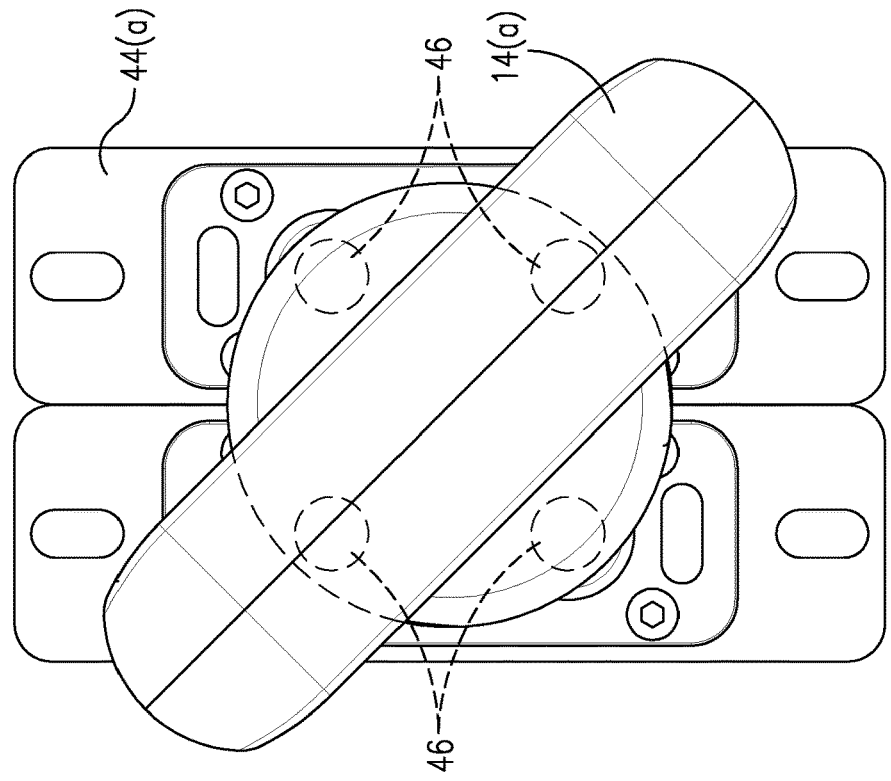
FIG. 10a is a top plan view of the steering control assembly from FIG. 5, particularly showing the steering control assembly rotated in a clockwise position.

As shown in FIGS. 10a (top view) and 10b (side view), rotating the steering handle 14(a) clockwise on the twist axis 76, without shifting the steering handle 14(a) forward or rearward on the tilt axis 74, depresses the front left and rear right depressible buttons 46. When the front left and rear right depressible buttons 46 are depressed an equal amount and the front right and rear left depressible buttons 46 are not depressed, as shown in FIGS. 10a and 10b, the left and right traction elements 16 rotate at substantially the same speed, with the left traction element 16 rotating forward and the right traction element 16 rotating rearward. In this configuration, the loader 10 turns clockwise without traveling forward or backward. It should be understood that the further the front left and rear right depressible buttons 46 are depressed the faster the left and right traction elements 16 will rotate so as to increase the turning speed or severity of the turn (i.e., the right turn) of the loader 10. As such, when the steering handle 14(a) is rotated clockwise a full amount forward, the front left and rear right depressible buttons 46 will be depressed a maximum amount, and the left and right traction elements 16 will rotate oppositely at a maximum rate to cause the loader to turn in a clockwise direction at a maximum speed/severity.

Figure 11B:
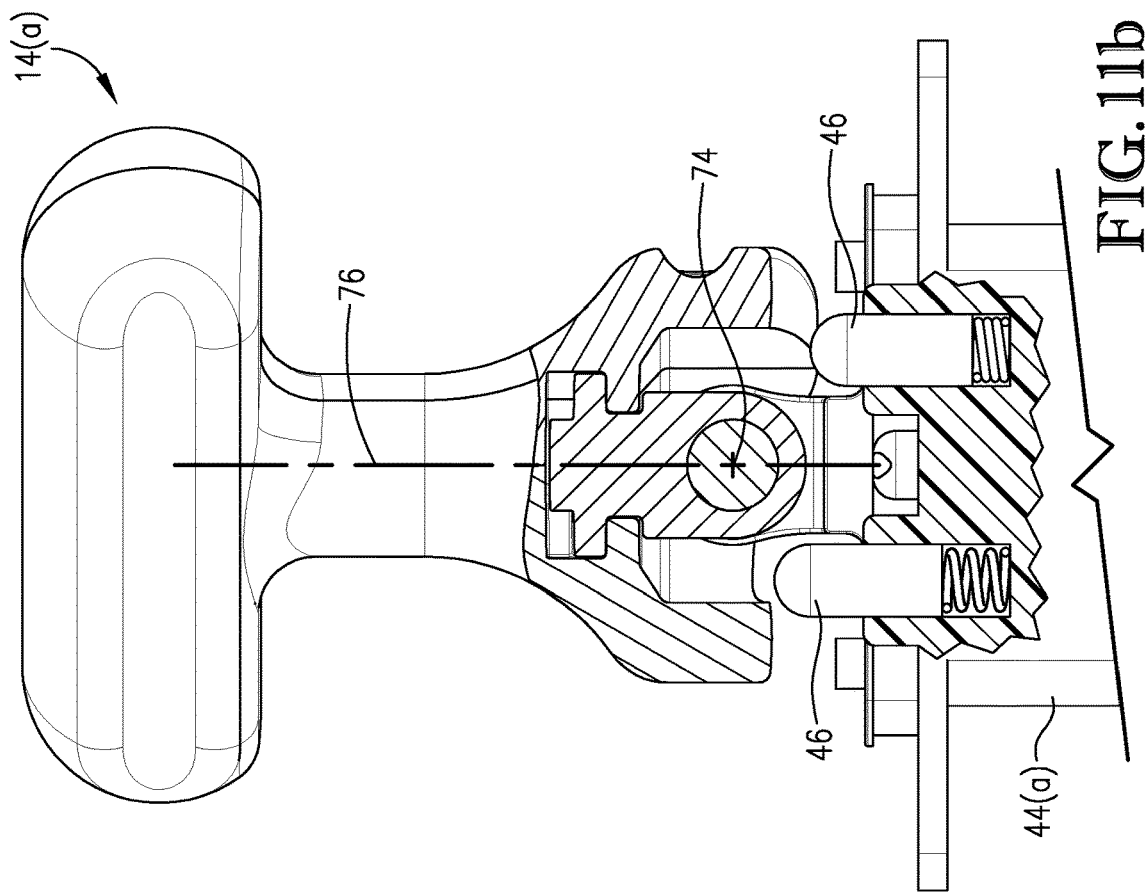
FIG. 11b is side elevation view of the steering control assembly from FIG. 11a, particularly showing a vertical cross section of a steering handle, a handle connection member, and a portion of a steering controller.
Figure 11A:
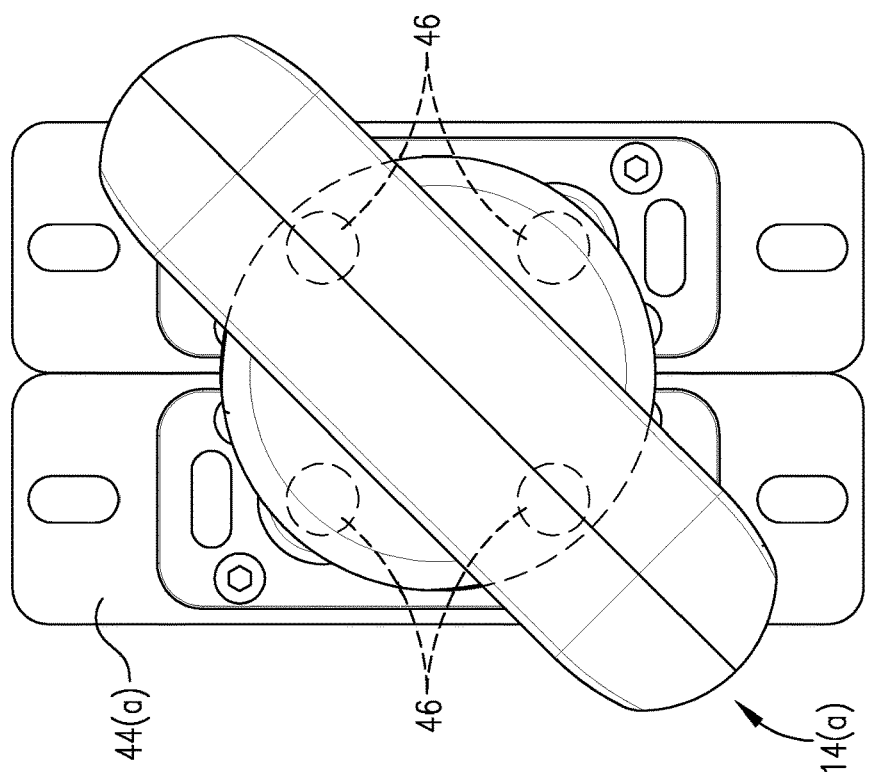
FIG. 11a is a top plan view of the steering control assembly from FIG. 5, particularly showing the steering control assembly rotated in a counterclockwise position.

As shown in FIGS. 11a (top view) and 11b (side view), rotating the steering handle 14(a) counterclockwise on the twist axis 76, without shifting the steering handle 14(a) forward or rearward on the tilt axis 74, depresses the front right and rear left depressible buttons 46. When the front right and rear left depressible buttons 46 are depressed an equal amount and the front left and rear right depressible buttons 46 are not depressed, as shown in FIGS. 11a and 11b, the right and left traction elements 16 rotate at substantially the same speed, with the right traction element 16 rotating forward and the left traction element 16 rotating rearward. In this configuration, the loader 10 turns counterclockwise without traveling forward or backward. It should be understood that the further the front right and rear left depressible buttons 46 are depressed the faster the left and right traction elements 16 will rotate so as to increase the turning speed or severity of the turn (i.e., the left turn) of the loader 10. As such, when the steering handle 14(a) is rotated counterclockwise a full amount forward, the rear left and front right depressible buttons 46 will be depressed a maximum amount, and the left and right traction elements 16 will rotate oppositely at a maximum rate to cause the loader to turn in a counterclockwise direction at a maximum speed/severity.

When the steering handle 14(a) is simultaneously tilted (forward or rearward) and twisted (clockwise or counterclockwise), both the speed (fast or slow) and direction of travel (forward, backward, and turning) of the loader 10 are simple and intuitively controlled by the operator using a single one hand on the steering handle 14(a).

Figure 12:
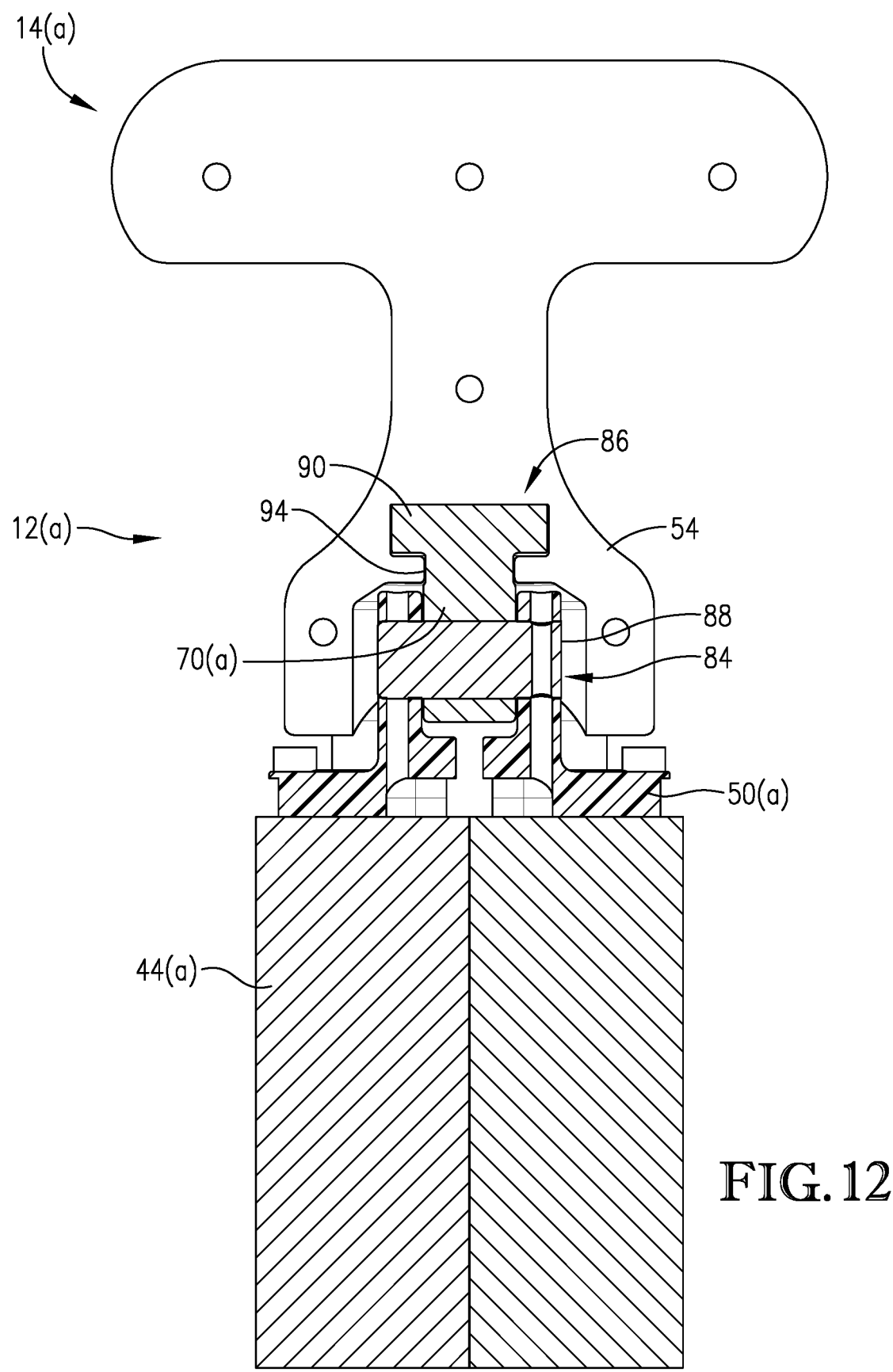
FIG. 12 is a vertical cross section of the steering control assembly from FIG. 5.
Figure 13A:
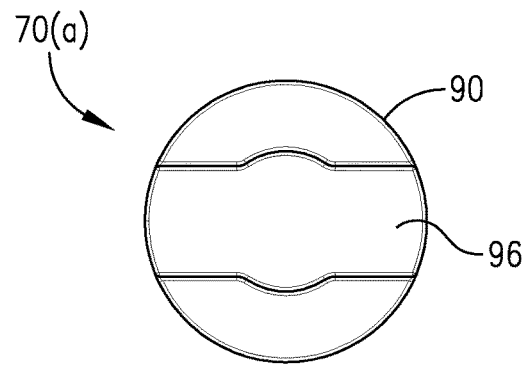
FIG. 13a is a top plan view of a handle connection member from the steering control assembly of FIG. 12.
Figure 13B:
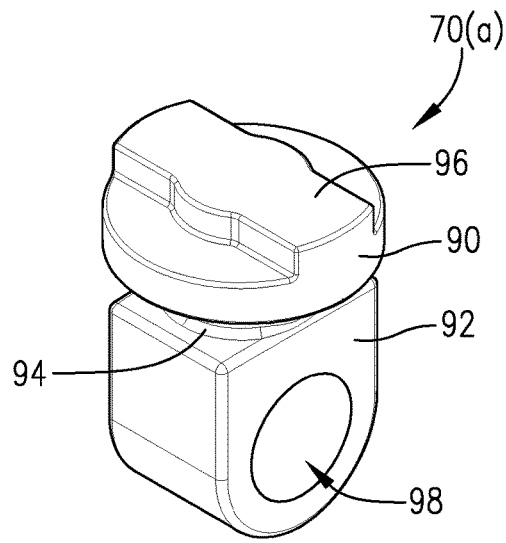
Figure 13C:
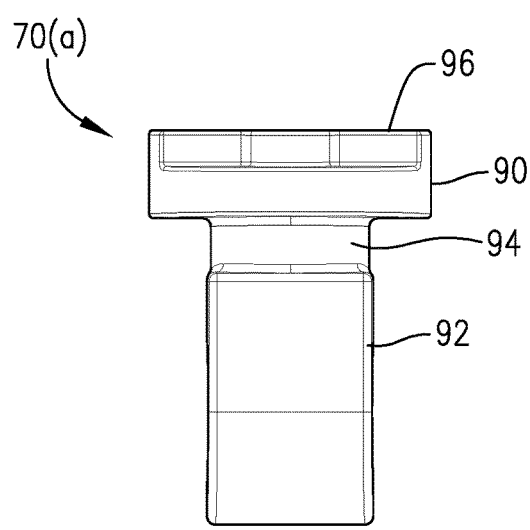
FIG. 13c is a side elevation view of the handle connection member from FIGS. 13a and 13b.
Figure 13D:
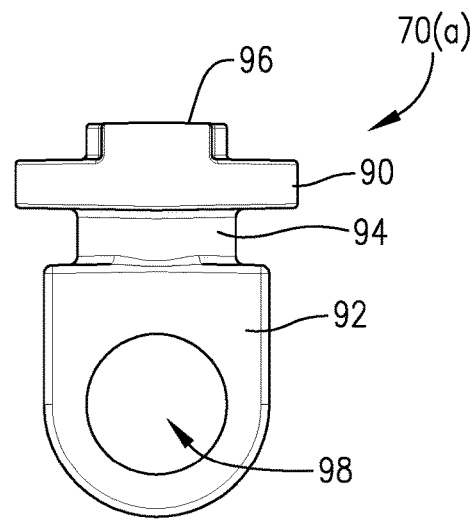
FIG. 13d is an additional side elevation view of the handle connection member from FIGS. 13a, 13b, and 13c.

FIG. 12 is a sectional view of the steering handle 14(a) and steering controller 44(a) in the neutral position. FIG. 12 also shows how the steering handle 14(a) is coupled to the steering controller 44(a) by a tilt hinge 84 and a twist hinge 86. The tilt hinge 86 is configured to permit the steering handle 14(a) to rotate relative to the steering controller 44(a) (and the panel support structure 22) on the tilt axis 74 (See FIG. 7b), while the twist hinge 86 is configured to permit the steering handle 14(a) to rotate relative to the steering controller 44(a) (and panel support structure 22) on the twist axis 76 (See FIG. 7b).

The tilt hinge 84 can be formed by the handle securement structure 50(a), the handle connection member 70(a), and a hinge pin 88. More specifically, the handle securement structure 50(a) is rigidly coupled to the steering controller 44(a), the handle connection member 70(a) is connected to the steering handle 14(a), and the hinge pin 88 extends through openings in both the handle connection member 70(a) and the handle securement structure 50(a) to secure the components together in a manner that permits the tilting of the handle connection member 70(a) relative to the handle securement structure 50(a) on the tilt axis 74. Generally, the hinge pin 88 is aligned with the tilt axis 74.

The twist hinge 76 can be formed by the handle connection member 70(a) and the base 54 of the steering handle 14(a). More specifically, the handle connection member 70(a) includes a head 90 that is received in an internal cavity of the base 54 in a manner that permits the steering handle 14(a) to rotate relative to the head 90 and the handle connection member 70(a) on the twist axis 76. Generally, the head 90 and/or the handle connection member 70(a) are aligned with the twist axis 76. Correspondingly, the upright extension member 56 of the steering handle 14(a) will generally be aligned with and/or centered on the twist axis 76, while the crossmember 52 is perpendicular to the twist axis 76 with the twist axis 76 extending through the crossmember 52.

As such, the steering control assembly 12(a) may comprises a handle connection assembly for attaching the steering handle 14(a) to the panel support structure 22, whereby said handle connection assembly comprises the tilt hinge 84 and the twist hinge 86. The tilt hinge 84 is configured to permit the steering handle 14(a) to tilt forward and rearward relative to the panel support structure 22 on a tilt axis 74, while the twist hinge 86 is configured to permit the steering handle 14(a) to twist clockwise and counterclockwise relative to the panel support structure 22 on a twist axis 76.

FIGS. 13a-d provides various views of the handle connection member 70(a) that can be received within the internal cavity of the steering handle 14(a). Specifically, FIGS. 13a-d show that the handle connection member 70(a) can includes an extension member 92, a neck 94, the head 90, and a projection 96.

The extension member 92 includes an attachment opening 98 through which the hinge pin 84 can extend, so as to couple the handle connection member 70(a) to the steering controller 44(a) (and the panel support structure 22) via the handle securement structure 50(a) in a manner that permits pivoting of the handle connection member 70(a) relative to the panel support structure 50(a) on the tilt axis 74. The head 90 is configured to be received in a broad portion of the internal cavity of the steering handle 14(a), as illustrated in FIG. 12. The neck 94 is configured to be received in a narrow portion of the internal cavity in a manner that prevents the head 90 from being pulled out of the internal cavity but permits rotation of the steering handle 14(a) relative to the handle connection member 70(a) on the twist axis 76. The projection 96 of the handle connection member 70(a) extends upwardly from the head 90 and is received in an upper portion of the internal cavity of the steering handle 14(a).

Figure 14:
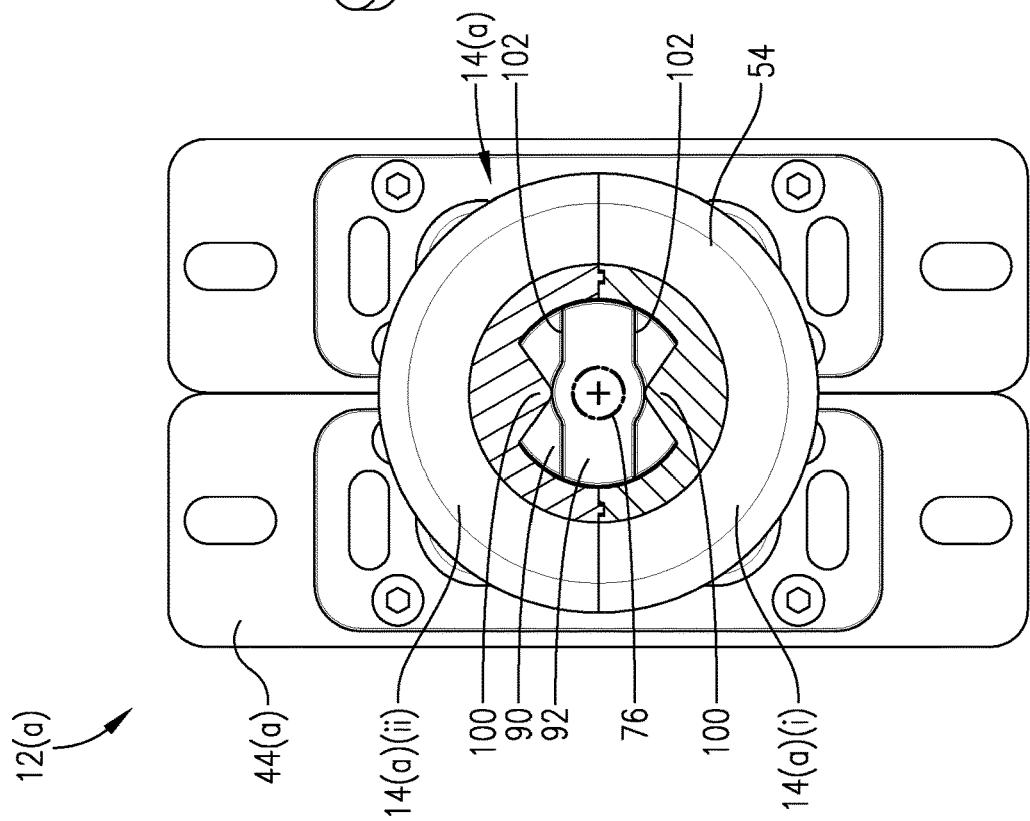
FIG. 14 is a top plan view of a horizontal cross section of the steering control assembly from FIG. 12.

FIG. 14 is a horizontal cross-sectional view cut through the steering handle 14(a) at the very top of the internal cavity that receives the head 90 of the handle connection member 70(a). FIG. 14 shows that the steering handle 14(a) includes stops 100 that extend into the broad portion of the internal cavity at the same level as the projection 92 of the handle connection member 70(a). These stops 100 may form part of a twist stop assembly, which are configured to be positioned within the steering handle 14(a) to restrict rotation of the steering handle 14(a) on the twist axis 76 within a certain range. When the steering handle 14(a) is fully twisted in a clockwise or counterclockwise manner, stop surfaces 102 of the projection 92 contact the stops 100 and prevent further rotation of steering handle 14(a) relative to the handle connection member 70(a), steering controller 44(a), and panel support structure 22.

In some embodiments, the steering handle 14(a) is rotatable on the twist axis 76 through a twist range of motion that is between 15 and 80 degrees, or 25 and 60 degrees, or 30 and 50 degrees. In addition, the steering handle 14(a) is shiftable on the tilt axis through a tilt range of motion that is between 15 and 80 degrees, or 25 and 60 degrees, or 30 and 50 degrees.

Stating the above differently, in some embodiments, the handle connection assembly comprises a panel attachment piece (e.g., the handle securement structure 50(a) and/or upper portions of the steering controller 44(a)), a handle attachment piece (e.g., handle connection member 70(a)), and a tilt hinge pin 88. The panel attachment piece can be attached to the panel support structure 22. The handle attachment piece can be attached to the handle 14(a). And the steering handle 14(a) and the panel attachment pieces are coupled to one another by the tilt hinge pin 88, with the tilt hinge pin 88 extending along the tilt axis 74. In some embodiments, the panel attachment piece will be rigidly coupled to the panel support structure 22, and the handle attachment piece will be rotatably coupled to the steering handle 14(a). The handle attachment piece includes a upper broadened head. The steering handle 14(a) defines an internal head-receiving cavity within which said broadened head is received to thereby couple the handle attachment piece to the steering handle 14(a). As a result, the steering handle is rotatable relative to the broadened head on the twist axis 76. Finally, the broadened head includes at least one projection, and the steering handle 14(a) includes at least one stop member. Contact between the projection and the stop member restricts rotation of the steering handle 14(a) relative to the panel support structure 22 on said twist axis 76.

Figure 15:
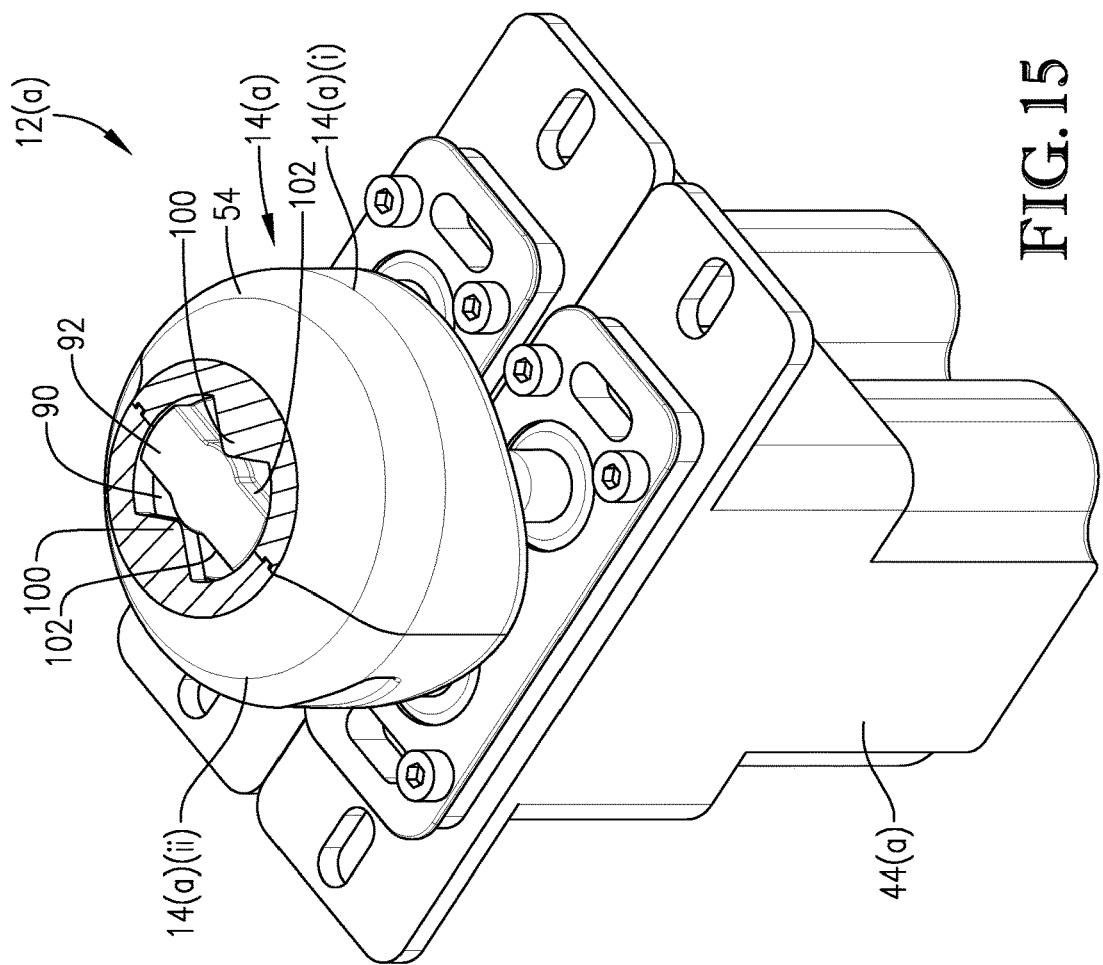
FIG. 15 is a perspective view of the horizontal cross section of the steering control assembly from FIG. 14.

As shown in FIGS. 14 and 15, as well as FIG. 7b, the steering handle 14(a) can be formed of two halves—a first handle half 14(a)(i) and a second handle half 14(a)(ii). With the steering handle 14(a) in the neutral, upright position, the first handle half 14(a)(i) may be rearward of the second handle half 14(a)(ii) and separated by a vertical plane. The first handle half 14(a)(i) may be secured to the second handle half 14(a)(ii) via one or more forward/rearward extending fasteners. In some embodiments, the first handle half 14(a)(i) and the second handle half 14(a)(ii) may be mirror images of each other. In some specific embodiments, at least interior portions of the first handle half 14(a)(i) and the second handle half 14(a)(ii) (e.g., the internal cavity) may be mirror images of each other. In some embodiments, the crossmember 52, the upright extension member 56, and the base 54 of the first handle half 14(a)(i) may be integrally formed from a unitary piece of material, while the crossmember 52, the upright extension member 56, and the base 54 of the second handle half 14(a)(ii) may be integrally formed from a unitary piece of material.

Forming the handle 14(a) in two halves, allows for easy attachment of the handle connection member 70(a) to the steering handle 14(a) by (i) placing the head 90 of the handle connection member 70(a) in the portion of the internal chamber defined by the first handle half 14(a)(i), (ii) aligning the second handle half 14(a)(ii) with the first handle half 14(a)(i) so that the head is the portion of the internal chamber defined by the second handle half 14(a)(ii), and (iii) coupling the two handle halves 14(a)(i) and 14(a)(ii) to one another (e.g., via the fasteners) while the head 90 is received in the internal cavity that is cooperatively formed by the first handle half 14(a)(i) and the second handle half 14(a)(ii).

Figure 16:
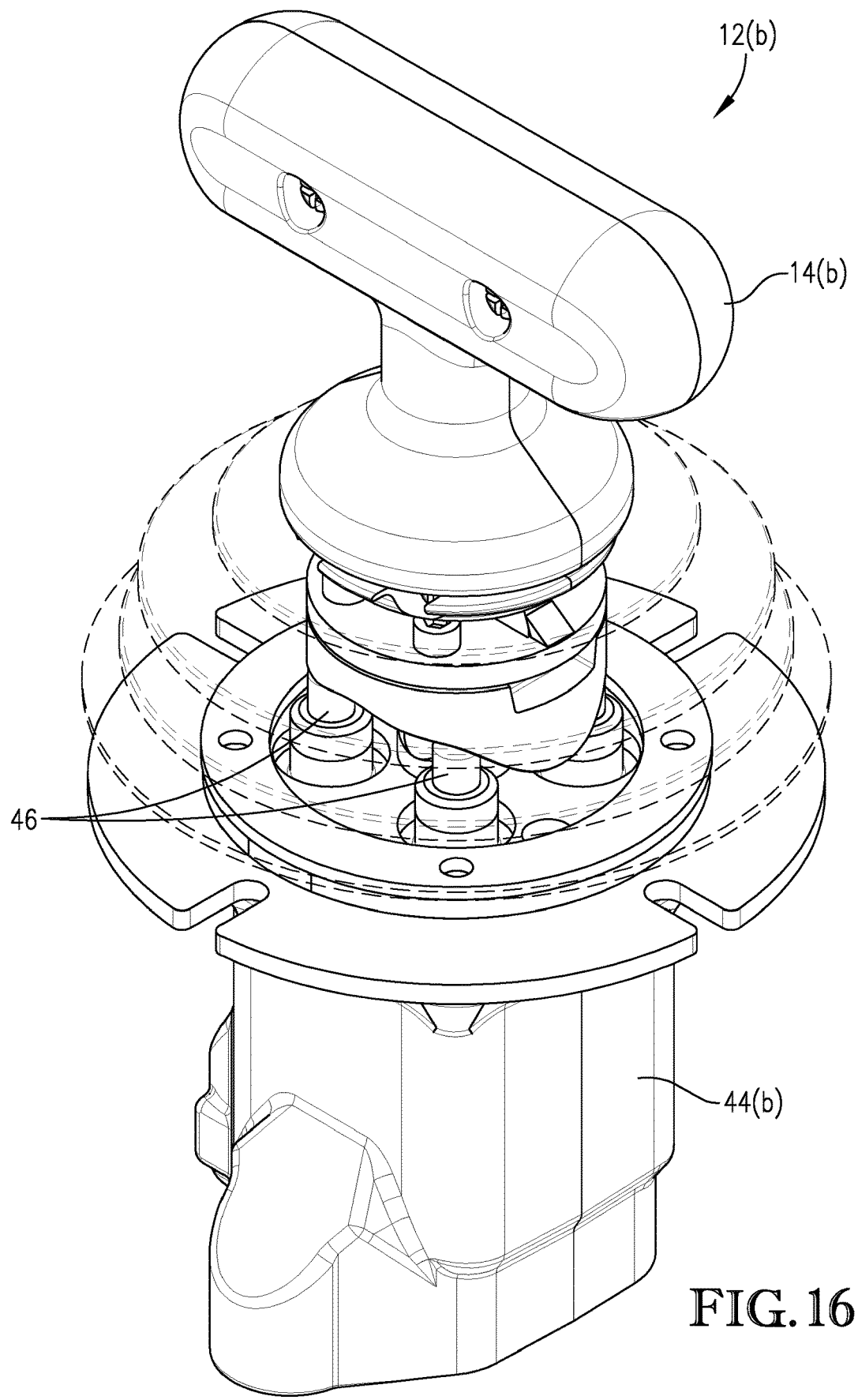
FIG. 16 is a perspective view of a steering control assembly according to additional embodiments of the present invention.

Another embodiment of a steering control assembly 12(b) is illustrated in FIG. 16. Broadly, the steering control assembly 12(b) will include a steering handle 14(b) secured to a steering controller 44(a). The steering control assembly 12(b) may include many of the same components and may be configured to perform many of the same functions as the steering control assembly 12(a) discussed above. As with steering control assembly 12(a), the steering control assembly 12(b) is configured such that steering handle 14(b) can be manually manipulated forwardly and rearwardly and can be manually twisted in clockwise and counterclockwise directions with respect to the steering controller 44(b) to selectively depress buttons 46 to control the speed and direction of rotation of the left and right traction elements 16 of the loader 10.

Figure 17:
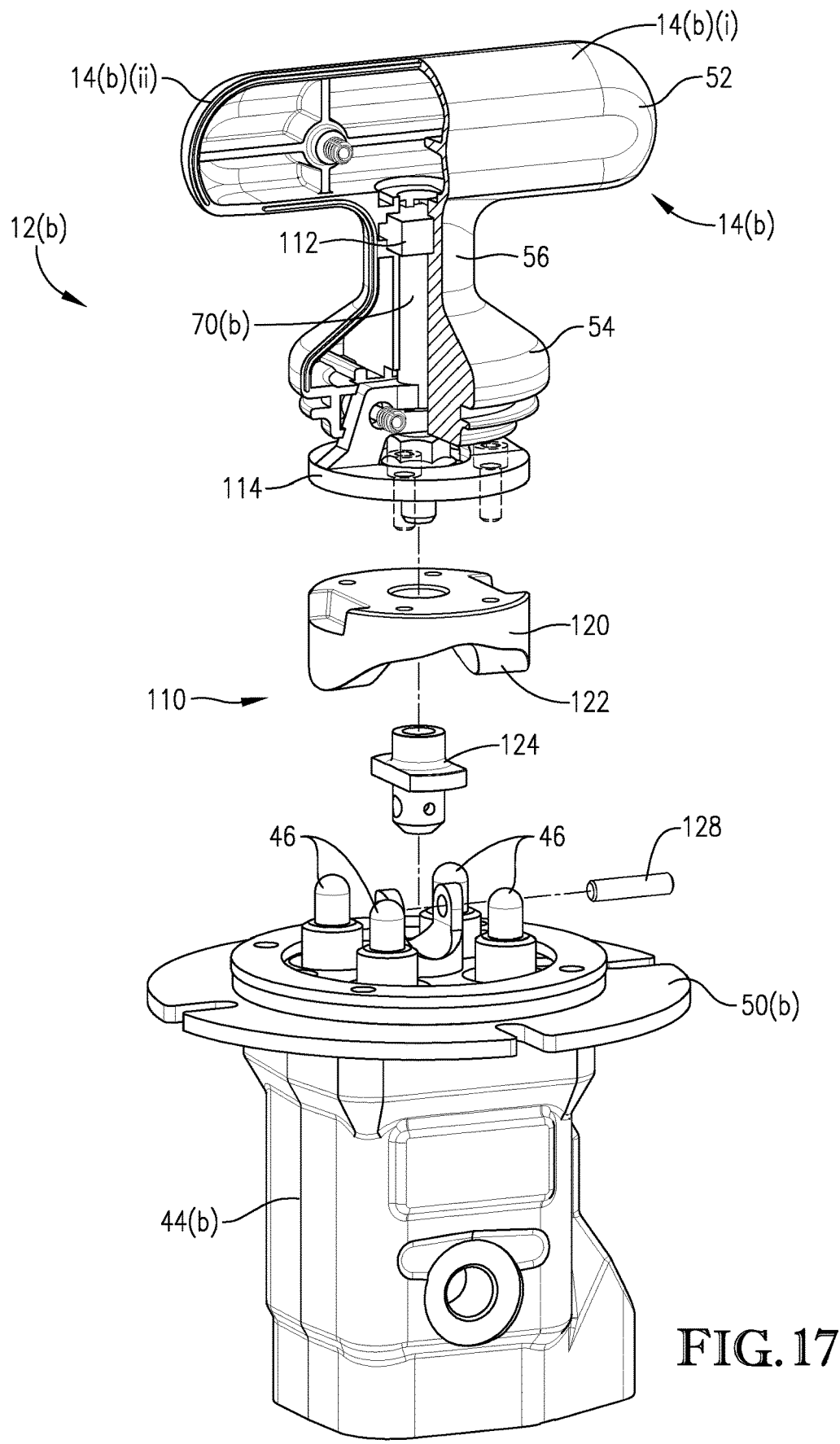
FIG. 17 is an exploded view of the steering control assembly from FIG. 16, with a portion of a steering handle cut away to show a handle connection assembly.

As shown in FIG. 17, the steering control assembly 12(b) comprises a handle connection assembly 110 that is used to secure the steering handle 12(b) to the steering controller 44(b). The handle connection assembly 110 may include a handle connection member 70(b) configured to extend upward into the internal cavity of the steering handle 14(b) in a similar manner as the handle connection member 70(a). However, the handle connection member 70(b) may be significantly longer than the handle connection member 70(a), such that the handle connection member 70(b) may extend into the internal cavity of the steering handle 14(b) up through base 54, through the upright extension member 56 and to (or into) the crossmember 52. The handle connection member 70(b) may include a head 112 at its upper end and an annular base 114 at its lower end.

The handle connection assembly 110 may additionally include a pedestal 120 to which the handle connection member 70(b) may be rigidly secured. In particular, the annular base 114 of the handle connection member 70(b) may be secured to an upper surface of the pedestal 120 via fasteners. Notably, a bottom of the pedestal may be formed with a curved bottom surface 122, which is formed similarly to the curved bottom surface 57 of the base 54 of the steering handle 14(a) discussed above. Specifically, the curved bottom surface 122 may include a substantially flat front section, a substantially flat rear section, a pair of left-side downwardly sloping sections, and a pair of right-side downwardly sloping sections. As such, the left-side downwardly sloping sections are formed on the sides of a left downward projection of the pedestal 120, and the right-side downwardly sloping sections are formed on the sides of a right downward projection of the pedestal 120. As a result, the curved bottom surface 122 of the steering assembly 12(b) is formed on the handle connection assembly 110 that secures the steering handle 14(b) to the steering controller 44(b).

The handle connection assembly 110 may additionally include a tilt member 124, which is configured to secure the handle connection member 70(b) and the pedestal 120 to the steering controller 44(b). In particular as perhaps best illustrated by FIG. 18, The tilt member 124 may be secured to the pedestal 120 via a threaded fastener 126 and associated washer, which permit the pedestal 120 to rotate about a twist axis 76 with respect to the tilt member 124. As shown, the twist axis 76 will generally be aligned longitudinally with the threaded fastener 126, the tilt member 124, and the handle connection member 70(b). The tilt member 124 will be secured to a second embodiment of a handle securement structure 50(b) via a pivot pin 128. The pivot pin 128 will be held in place within the tilt member 124 via a set screw 129 extending through the tilt member 124 and into engagement with the pivot pin 128. With the pivot pin 128 securing the tilt member 124 to the handle securement structure 50(b), the pivot pin 128 will be aligned (and will present) the tilt axis 74. As illustrated in FIG. 17, the handle securement structure 50(b) is secured to the steering controller 40(b), such that the handle connection assembly 110 and the steering handle 14(b) are operably secured to the steering controller 44(b) (e.g., to depress associated buttons 46 as required).

Figures 18, 19:
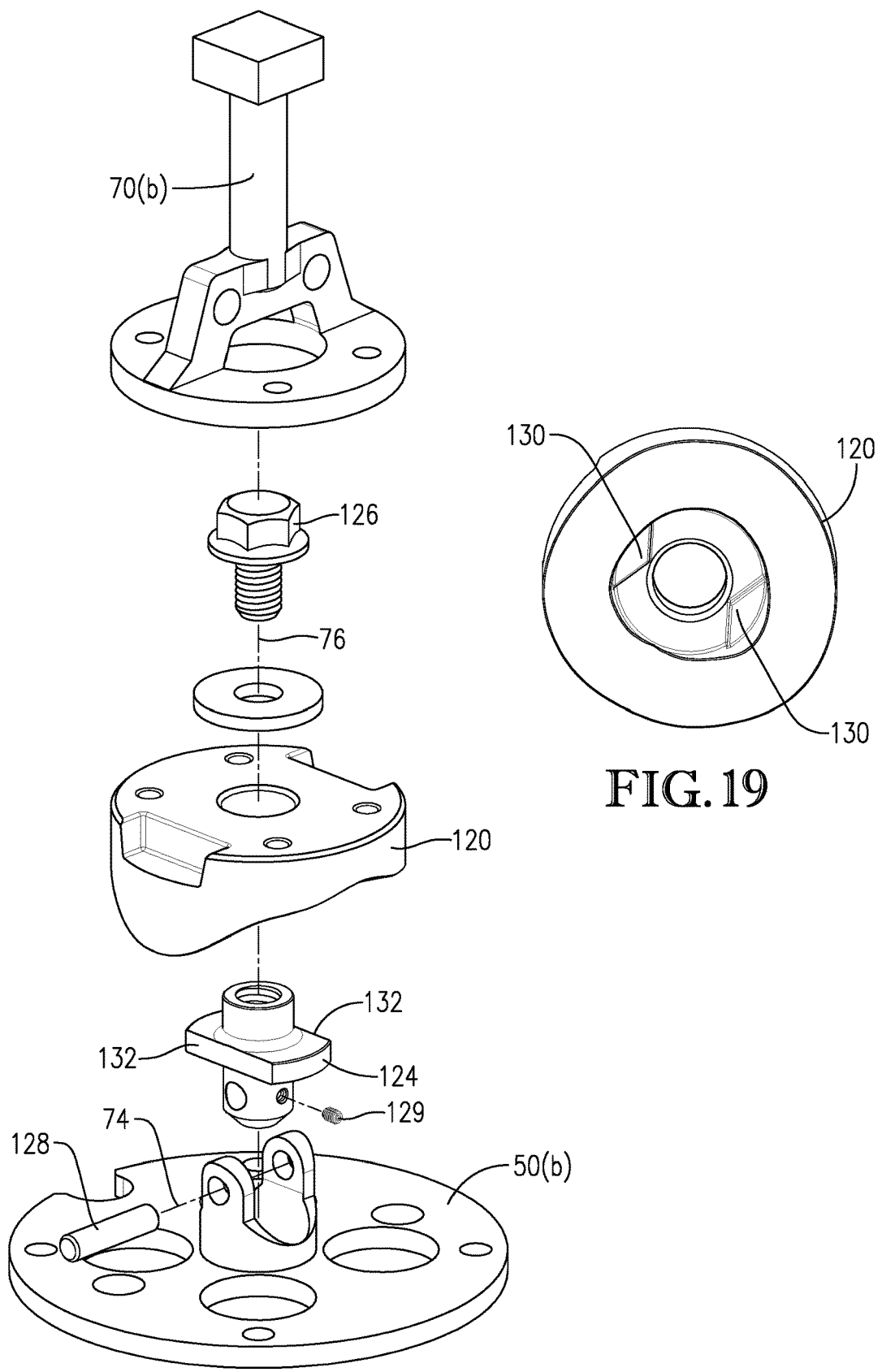
FIG. 18 is an exploded view of the handle connection assembly from FIG. 17 in conjunction with a handle securement structure from the steering control assembly.
FIG. 19 is a bottom perspective view of a pedestal from the handle connection assembly from FIG. 18.
Figure 20B:
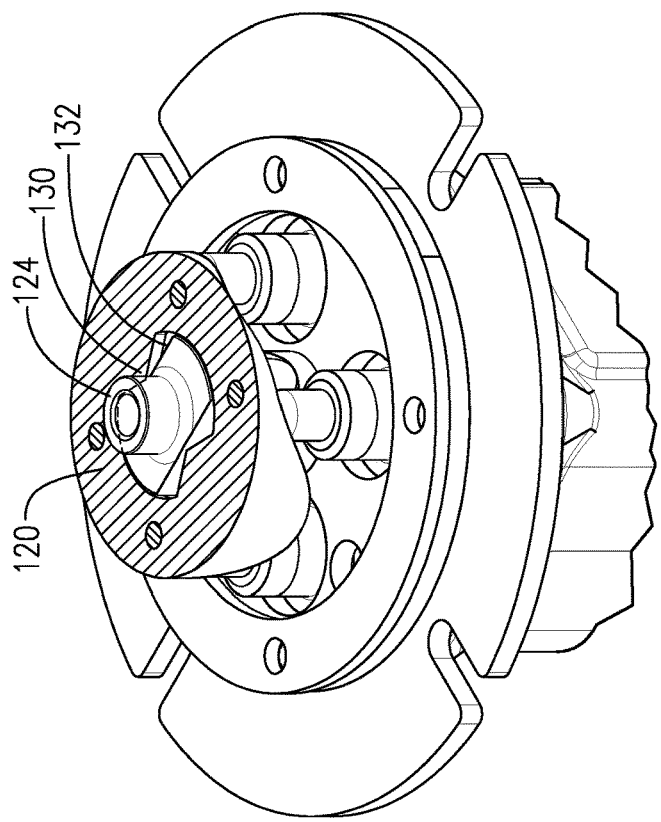
Figure 20A:
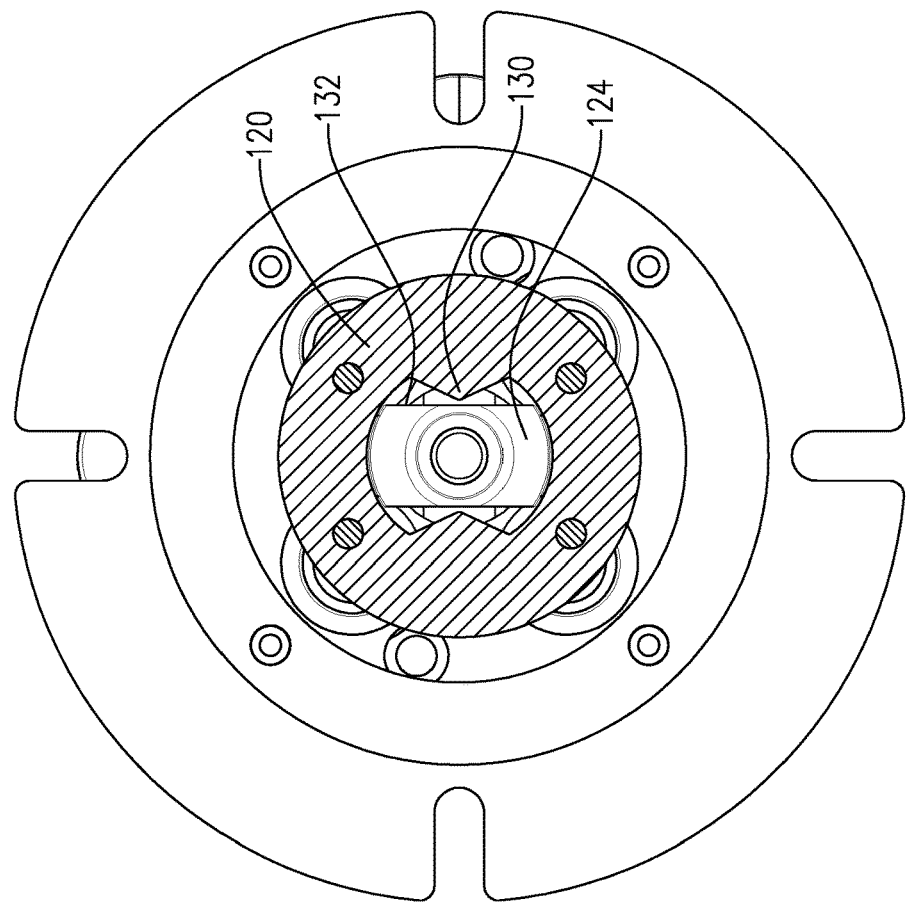
FIG. 20a is a top plan view of a horizontal cross section of the steering control assembly from FIG. 16.

Returning to the pedestal 120, as perhaps best shown by FIG. 19, the pedestal includes an internal cavity with a pair of inwardly-orientated, triangular-shaped stops 130, which may form part of a twist stop assembly. When the pedestal 120 is secured to the tilt member 124, the stops 130 will be positioned at the same level as stop surfaces 132 extending from the tilt member 124 (See stop surfaces 132 on FIG. 18). FIGS. 20(a) and 20(b) show a horizontal cross-sectional view cut through the pedestal 120 at the internal cavity that receives tilt member 124. The figures show that the pedestal 120 includes the stops 130 extending into the internal cavity at the same level as the stop surfaces 132 of the tilt member 124. These stops 130 are configured to restrict rotation of the steering handle 14(b) on the twist axis 76 within a certain range. When the steering handle 14(b) is fully twisted in a clockwise or counterclockwise manner, stop surfaces 132 of the tilt member 124 contact the stops 130 and prevent further rotation of steering handle 14(b) relative to the handle connection assembly 110 (including the handle connection member 70(b)), the steering controller 44(b), and panel support structure 22.

In some embodiments, the steering handle 14(b) is rotatable on the twist axis 76 through a twist range of motion that is between 15 and 80 degrees, or 25 and 60 degrees, or 30 and 50 degrees. In addition, the steering handle 14(b) is shiftable on the tilt axis 74 through a tilt range of motion that is between 15 and 80 degrees, or 25 and 60 degrees, or 30 and 50 degrees.

Figure 21:
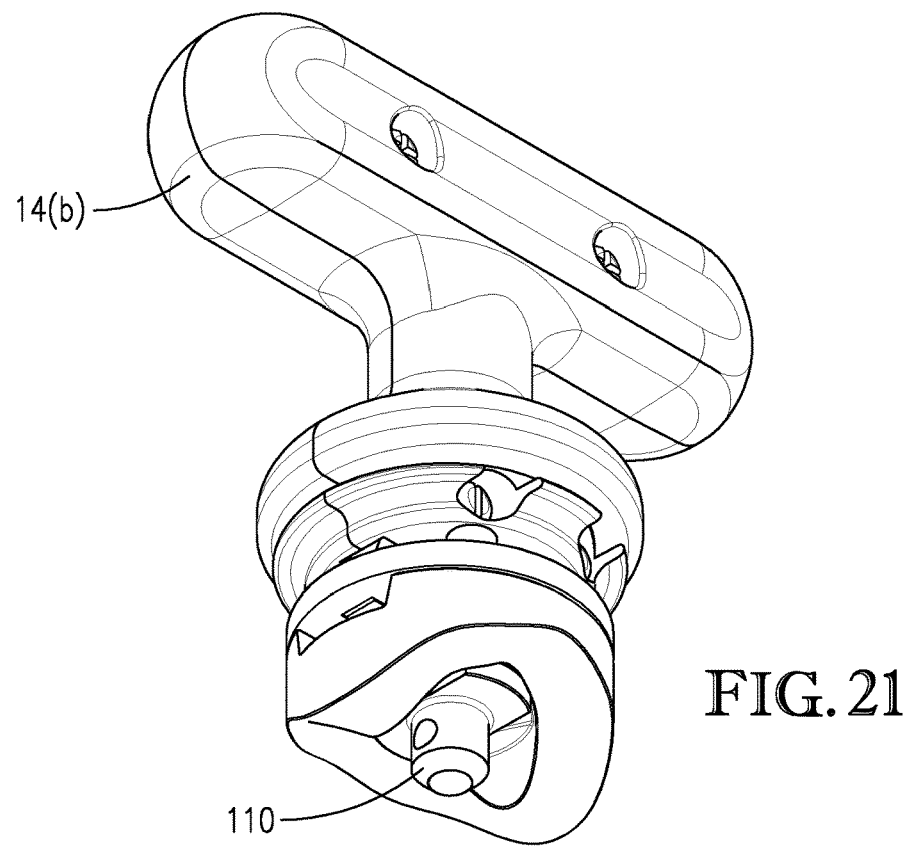
FIG. 21 is a bottom perspective view of a steering handle and a handle connection assembly from the steering control assembly from FIG. 16.
Figure 22:
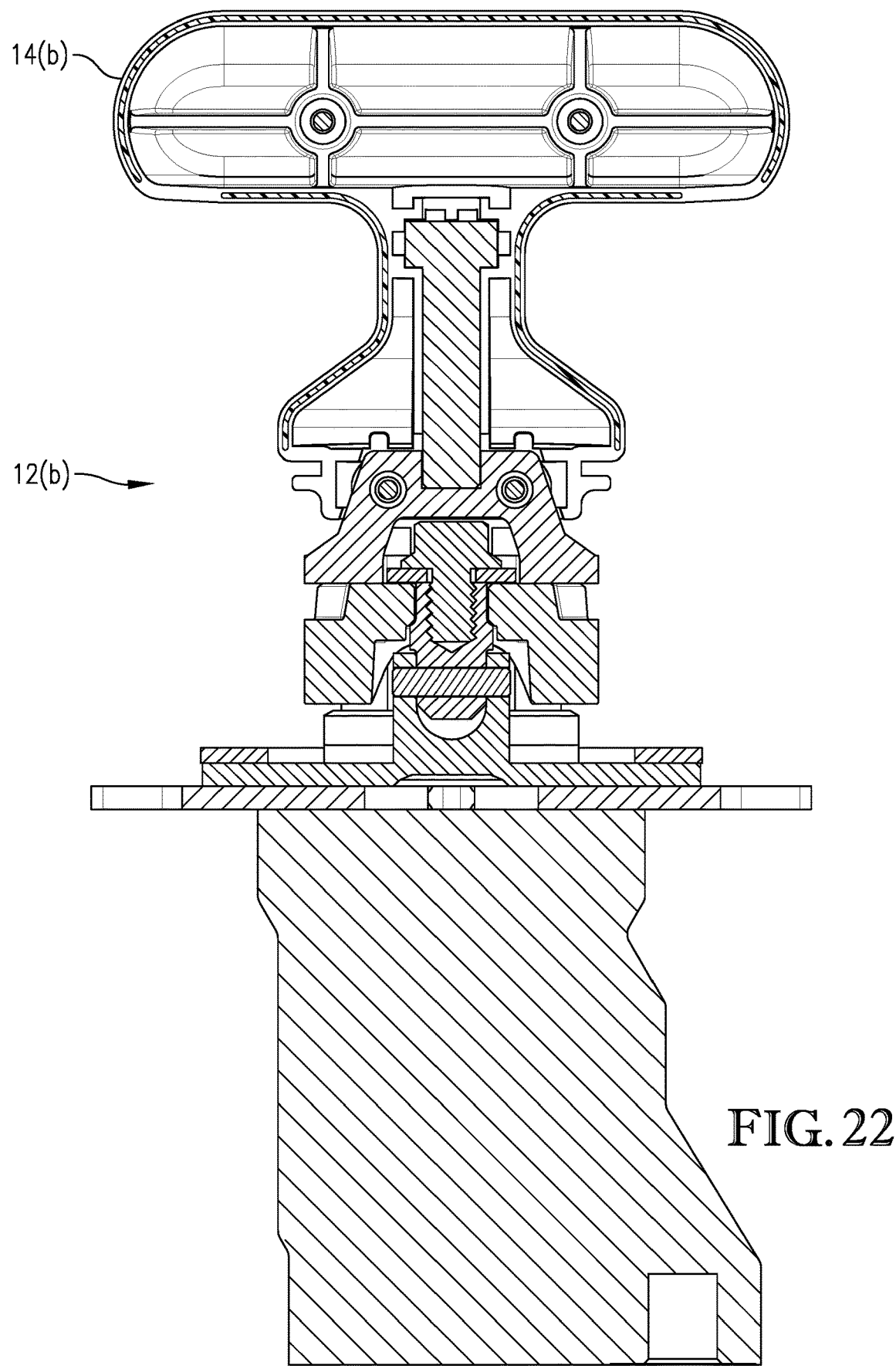
FIG. 22 is vertical cross section of the steering control assembly from FIG. 16.

FIG. 21 further illustrates the steering handle 14(b) coupled together with the handle connection assembly 110. FIG. 22 is a vertical cross-section showing how the components of the steering control assembly 12(b) fit together. FIGS. 23(a)-27(b) show how the steering handle 14(b) can be manipulated with respect to the steering controller 44(b) to control the loader 10.

Figure 23A:
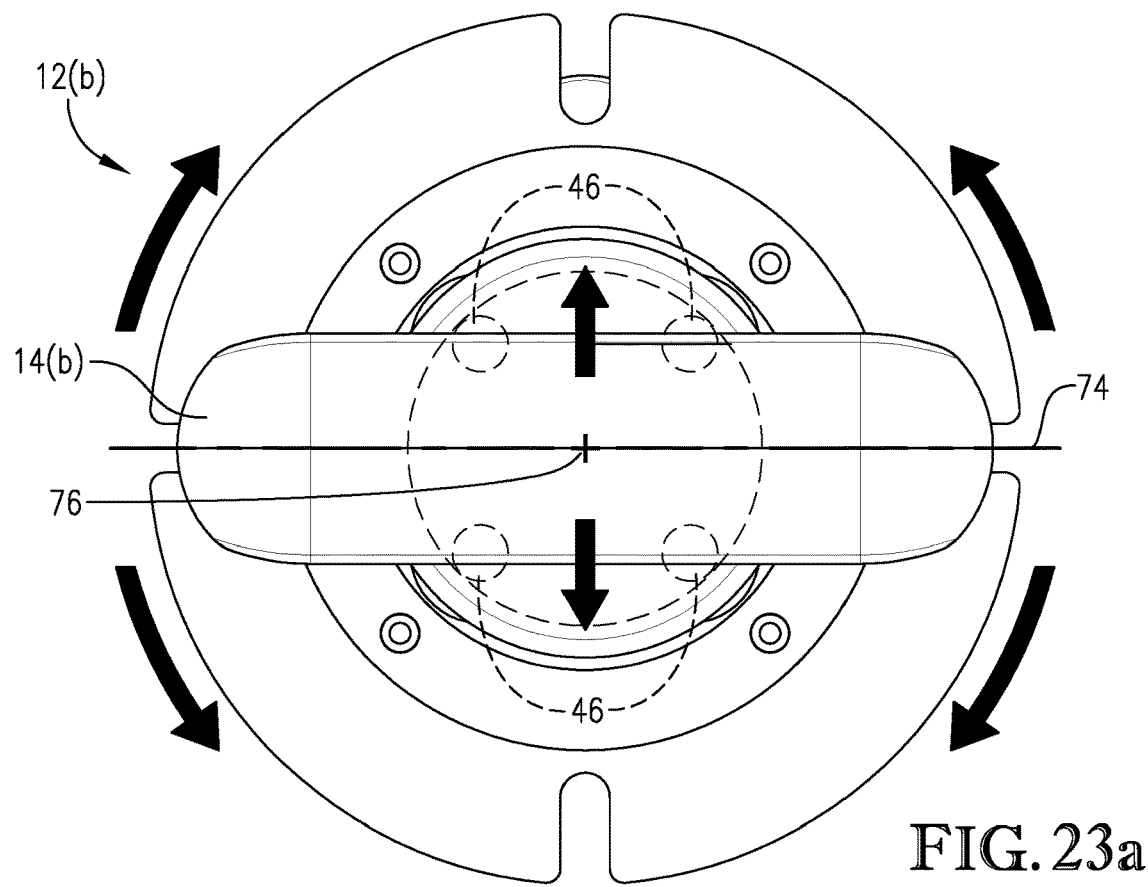
FIG. 23a is a top plan view of the steering control assembly from FIG. 16, particularly showing the steering control assembly in a neutral position.

FIGS. 23a (top view) and 23b (side view) show the steering control assembly 12(b) in a neutral position. When the steering control assembly 12(b) is in the neutral position, none of the depressible buttons 46 are depressed enough to cause rotation of the right or left traction elements 16 of the loader 10. The steering control assembly 12(b) is biased toward this neutral position so that if the operator of the loader 10 releases a hand grip on the steering handle 14(b), the loader 10 stops. Specifically, the steering controller 44(b) can includes the variable switch and a biasing mechanism for biasing the depressible buttons 46 upwardly, similar to that described for steering controller 44(a) above. When the steering handle 14(a) is not being manually manipulated out of the neutral position, all the depressible buttons 46 are fully extended and the steering handle 14(b) is maintained in the neutral position by the depressible buttons 46 pushing up against the substantially flat front and rear portions of the curved bottom surface 122 of the pedestal 120. In some embodiments, the steering controller 44(b) may be a hydraulic pilot control valve and movement of the depressible buttons 46 directly adjusts the flow of hydraulic fluid through the control valve to control direction and speed of the right and left traction elements 16 via the hydraulic motors.

Figure 23B:
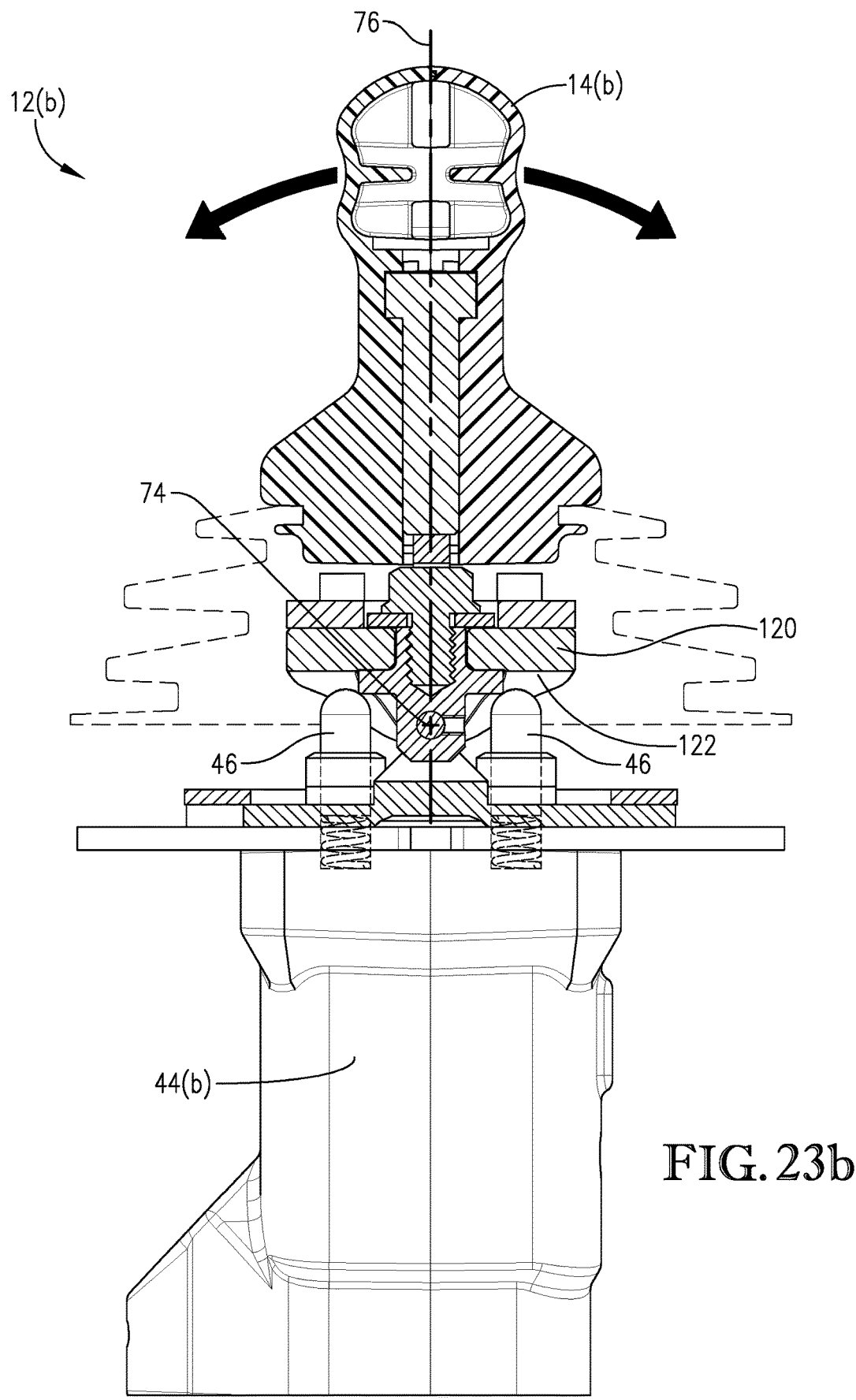
FIG. 23b is side elevation view of the steering control assembly from FIG. 23a, particularly showing a vertical cross section of a steering handle, a handle connection assembly, and a portion of a steering controller.

FIGS. 23a and 23b show that the steering handle 14(b) is connected to the steering controller 44(b) in a manner that allows the steering handle 14(b) to be shifted/tilted forward and rearward on tilt axis 74. Further, the steering handle 14(b) is connected to the steering controller 44(b) in manner that allows the steering handle 14(b) to be rotated/twisted clockwise and counterclockwise on twist axis 76. The tilt axis 74 and twist axis 76 are maintained substantially perpendicular to one another, even during shifting or rotating of the steering handle 14(b).

Figure 26B:
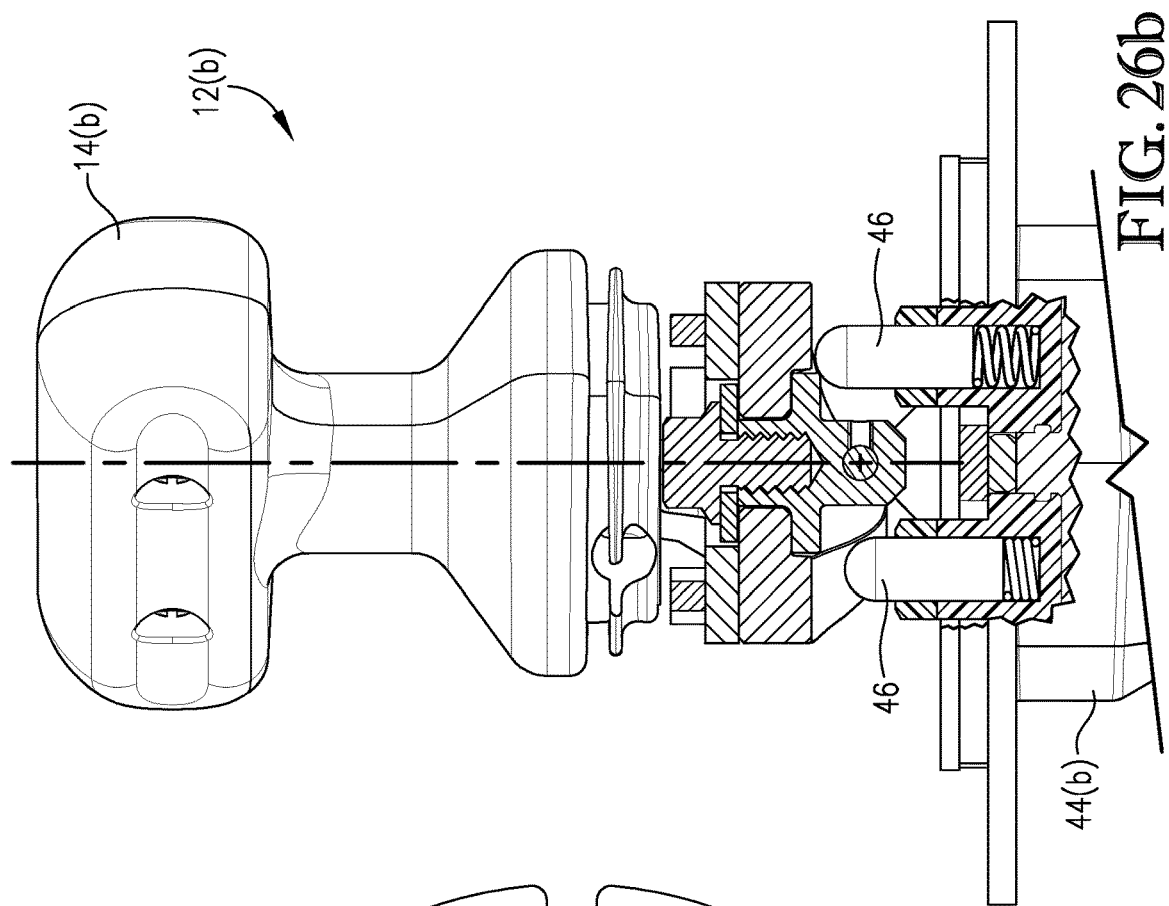
FIG. 26b is side elevation view of the steering control assembly from FIG. 26a, particularly showing a vertical cross section of a steering handle, a handle connection assembly, and a portion of a steering controller.
Figure 26A:
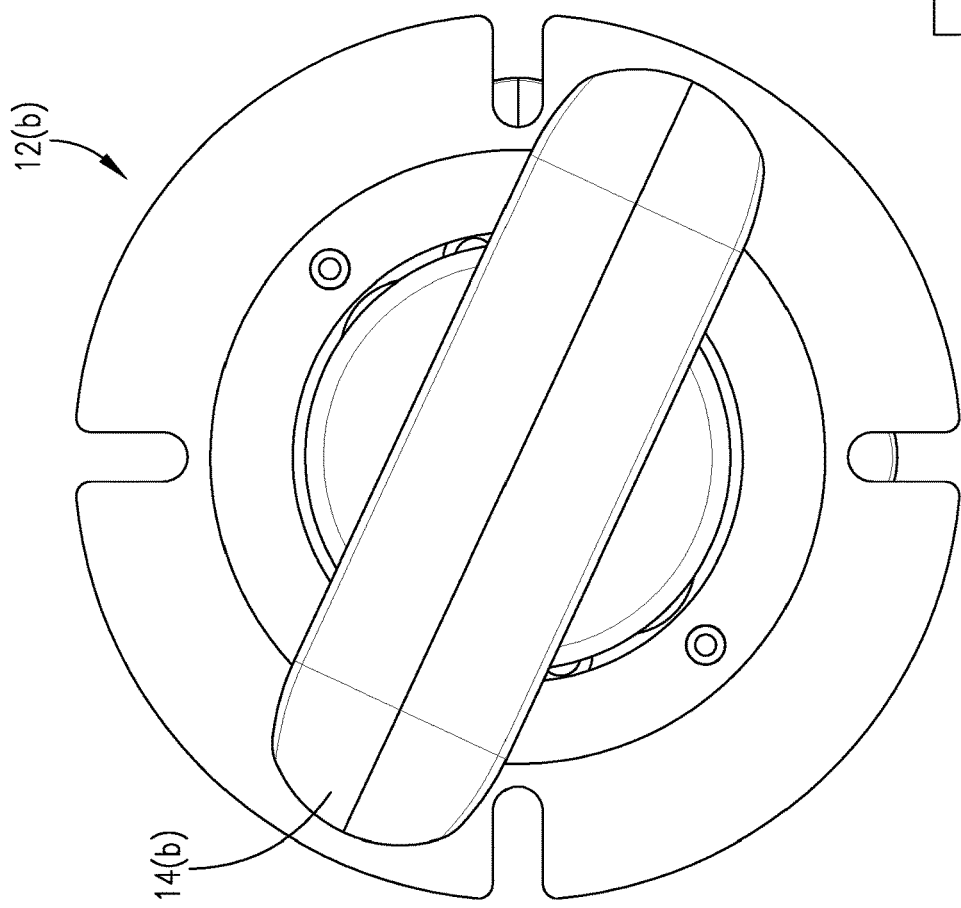
FIG. 26a is a top plan view of the steering control assembly from FIG. 16, particularly showing the steering control assembly rotated in a clockwise position.

Certain of the remaining functionality of the steering control assembly 12(b) is similar to that described above for steering control assembly 12(a). As shown in FIGS. 24a (top view) and 24b (side view) steering handle 14(b) can be tilted forward such that the right and left traction elements 16 rotate forward at substantially the same speed, so the loader 10 travels straight forward. As shown in FIGS. 25a (top view) and 25b (side view), the steering handle 14(b) can be shifted rearward causing the right and left traction elements 16 rotate reward at substantially the same speed, so the loader 10 travels straight backward (i.e., in reverse). As shown in FIGS. 26a (top view) and 26b (side view), the steering handle 14(b) clockwise such that the right and left traction elements 16 rotate at substantially the same speed, with the left traction element 16 rotating forward and the right traction element 16 rotating rearward. In this configuration, the loader 10 turns clockwise without traveling forward or backward. Finally, as shown in FIGS. 27a (top view) and 27b (side view), the steering handle 14(b) can be rotated counterclockwise such that the right and left traction elements 16 rotate at substantially the same speed, with the right traction element 16 rotating forward and the left traction element 16 rotating rearward. In this configuration, the loader 10 turns counterclockwise without traveling forward or backward.

When the steering handle 14(b) is simultaneously tilted (forward or rearward) and twisted (clockwise or counterclockwise), both the speed (fast or slow) and direction of travel (forward, backward, and turning) of the vehicle are easily and intuitively controlled by the operator using a single one hand on the steering handle 14(b).

As shown in FIG. 17, the steering handle 14(b) can be formed of two halves—a first handle half 14(b)(i) and a second handle half 14(b)(ii). The first handle half 14(a)(i) may be secured to the second handle half 14(a)(ii) via one or more forward/rearward extending fasteners or a snap fit-connection. Forming the handle 14(b) in two halves, allows for easy attachment of the handle connection assembly 110, including the handle connection member 70(b) to the steering handle 14(b) by (i) placing the handle connection member 70(b) in the internal chamber defined by the first handle half 14(b)(i), (ii) aligning the second handle half 14(b)(ii) with the first handle half 14(b)(i) so that the handle connection member 70(b) is the portion of the internal chamber defined by the second handle half 14(b)(ii), and (iii) coupling the two handle halves 14(b)(i) and 14(b)(ii) to one another (e.g., via the fasteners) while the handle connection member 70(b) is received in the internal cavity that is cooperatively formed by the first handle half 14(b)(i) and the second handle half 14(b)(ii).

Figure 28B:
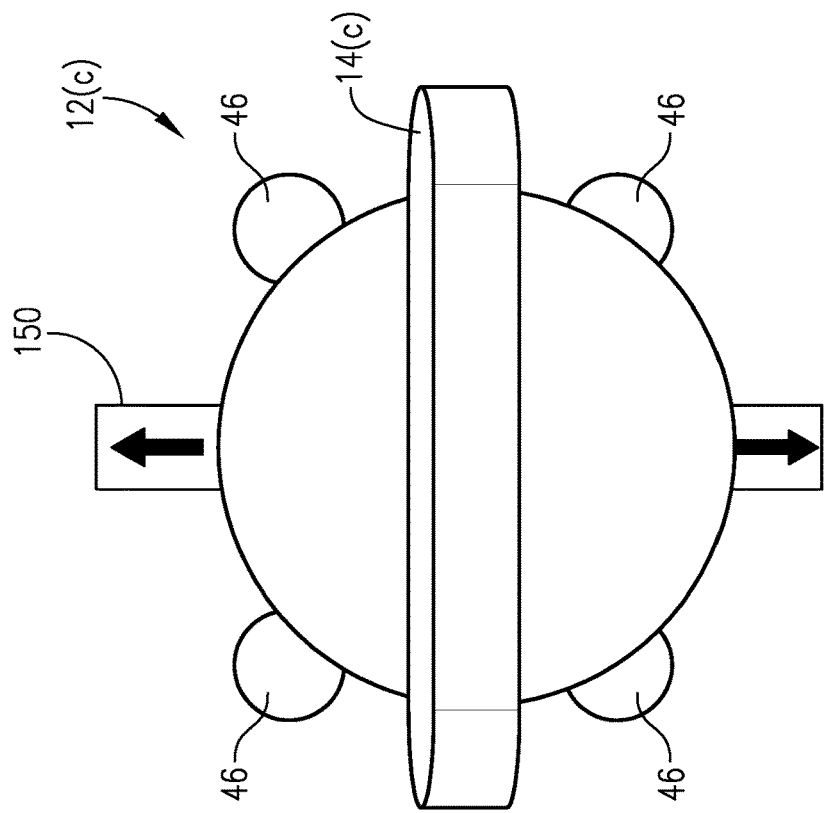
Figure 28A:
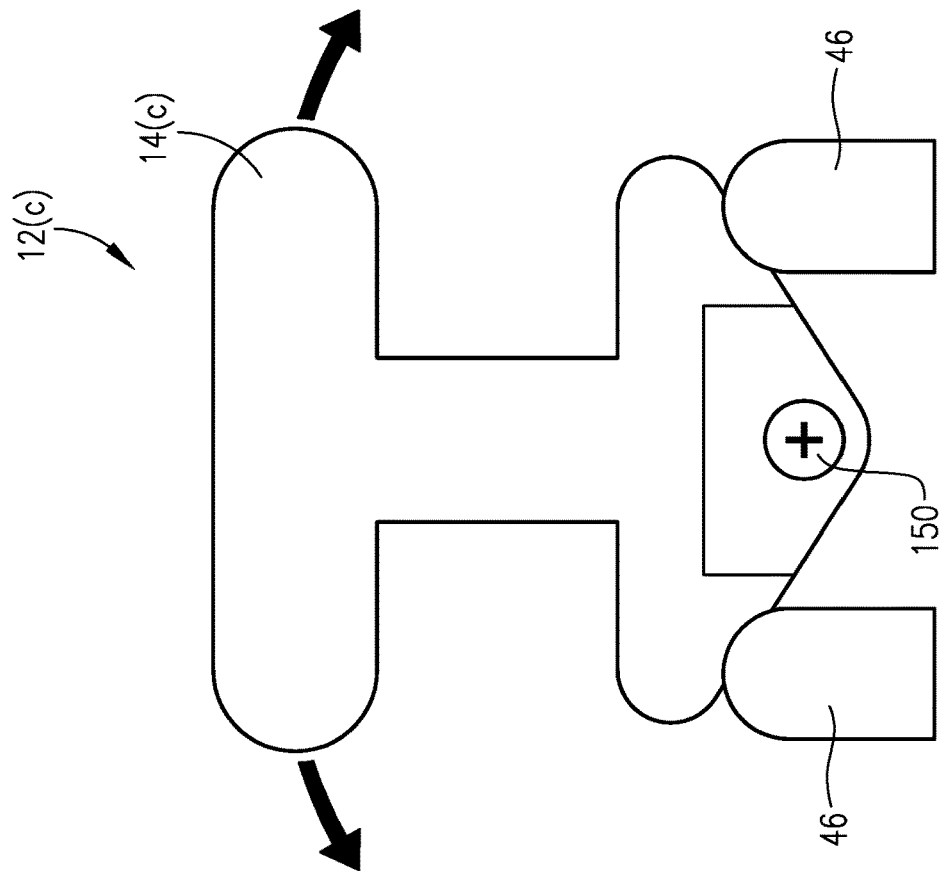
FIG. 28a is a side elevation schematic view of an additional embodiment of a steering control assembly in which a steering handle is configured to forwardly and rearwardly translated along a rail.

Although the steering handle assemblies 12(a), 12(b) described above are configured to pivot/rotate on two axes (i.e., a tilt axis 74 and the twist axis 76), it should be understood that other embodiments of a steering handle assembly may be configured to include a steering handle that can translate forward, rearward, and/or side-to-side relative to a steering controller, rather than pivot/rotate relative to the steering controller. For example, in the embodiment depicted FIGS. 28a and 28b, an embodiment of a steering handle assembly 12(c) is illustrated with a steering handle 14(c) mounted on a rail 150 that permits forward and rearward translation of the steering handle 14(c) relative to a steering controller (identified by the depressible buttons 46). In such a configuration, forward and rearward movement of the loader 10 can be controlled by sliding the steering handle 14(c) forward and rearward on the rail 150, while turning of the loader 10 can be controlled by tilting the steering handle 14(c) left and right on an axis that is coextensive with the rail 150.

Having thus described one or more embodiments of the invention, what is claimed as new and desired to be protected by Letters Patent includes the following:

What is claimed is:

1. A vehicle steering assembly for controlling movement of a vehicle having independently rotatable left and right ground-engaging traction elements, the vehicle comprising a control panel within reach of an operator of the vehicle, the control panel comprising a panel support structure for supporting at least one control or display mechanism of the vehicle, said steering assembly comprising:
    a steering handle coupled to the panel support structure and extending away from the panel support structure,
    wherein said steering handle comprises a laterally-extending crossmember and at least one upright extension member,
    wherein said crossmember and said upright extension member are rigidly connected to one another so that shifting of said crossmember relative to said extension member is substantially prevented,
    wherein said steering handle is shiftable in forward and rearward directions to thereby cause corresponding forward and rearward rotation of both of said left and right traction elements,
    wherein said steering handle is rotatable in clockwise and counterclockwise directions to thereby cause a change in the relative speeds and directions of rotation of said left and right traction elements,
    wherein said steering assembly further comprises a plurality of depressible buttons positioned generally below said steering handle,
    wherein said buttons cooperatively control the speed and direction of rotation of said left and right traction elements,
    wherein said steering assembly comprises a plurality of variable switches,
    wherein each of said variable switches comprises at least one of said depressible buttons,
    wherein the speed of rotation of said left and right traction elements is determined by how far down said depressible buttons are depressed.

2. The vehicle steering assembly of claim 1, wherein the vehicle is a compact utility loader.

3. The vehicle steering assembly of claim 2, wherein the compact utility loader comprises a loader system, a drive system, and a power source for powering the loader system and the drive systems.

4. The vehicle steering assembly of claim 1, wherein said left and right traction elements each comprises tracks.

5. The vehicle steering assembly of claim 1, wherein a degree of forward or rearward shifting of said steering handle dictates a respective speed of forward or rearward movement of said vehicle, wherein a degree of twisting of said steering handle dictates a severity of turning of said vehicle.

6. The vehicle steering assembly of claim 1, wherein said steering handle includes only a single upright extension member.

7. The vehicle steering assembly of claim 1, wherein at least a portion of said crossmember and at least a portion of said upright extension member are integrally formed.

8. The vehicle steering assembly of claim 1, wherein said steering handle is coupled to the panel support structure in a manner such that lateral shifting of said steering handle relative to the panel support structure is substantially prevented.

9. The vehicle steering assembly of claim 1, wherein said steering handle is forward and rearward shiftable on a tilt axis, wherein said steering handle is clockwise and counterclockwise rotatable on a twist axis, wherein said tilt axis and said twist axis are oriented substantially perpendicular to one another.

10. The vehicle steering assembly of claim 9, wherein said crossmember extends substantially perpendicular to said twist axis, wherein said twist axis extends through said crossmember.

11. The vehicle steering assembly of claim 9, wherein said steering assembly comprises a twist stop assembly for restricting rotation of said steering handle relative to the panel support structure on the twist axis.

12. The vehicle steering assembly of claim 1, wherein said steering handle comprises a base presenting a lower surface having a curved topography, wherein said lower surface is configured to depress said buttons in response to manipulation of said steering handle by an operator of said vehicle.

13. The vehicle steering assembly of claim 1, wherein said steering assembly further comprises a handle connection assembly for attaching said steering handle to said panel support structure, where said handle connection assembly comprises a tilt hinge and a twist hinge, wherein said tilt hinge is configured to permit said steering handle to tilt forward and rearward relative to said panel support structure on a tilt axis, wherein said twist hinge is configured to permit said steering handle to twist clockwise and counterclockwise relative to said panel support structure on a twist axis.

14. The vehicle steering assembly of claim 13, wherein said tilt axis is substantially horizontal and said twist axis is substantially perpendicular to said tilt axis.

15. A vehicle steering assembly for controlling movement of a vehicle having independently rotatable left and right ground-engaging traction elements, the vehicle comprising a control panel within reach of an operator of the vehicle, the control panel comprising a panel support structure for supporting at least one control or display mechanism of the vehicle, said steering assembly comprising:
 a steering handle coupled to the panel support structure and extending away from the panel support structure,
 wherein said steering handle comprises a laterally-extending crossmember and at least one upright extension member,
 wherein said crossmember and said upright extension member are rigidly connected to one another so that shifting of said crossmember relative to said extension member is substantially prevented,
 wherein said steering handle is shiftable in forward and rearward directions to thereby cause corresponding forward and rearward rotation of both of said left and right traction elements,
 wherein said steering handle is rotatable in clockwise and counterclockwise directions to thereby cause a change in the relative speeds and directions of rotation of said left and right traction elements,
 wherein said steering assembly is configured such that (i) shifting said steering handle forward from said neutral position toward a forward position causes forward rotation of both said left and right traction elements, (ii) shifting said steering handle rearward from said neutral position toward a rearward position causes rearward rotation of both said left and right traction elements, (iii) twisting of said steering handle clockwise from said neutral position toward a clockwise twisted position causes forward rotation of said left traction element and rearward rotation of said right traction element, and (iv) twisting of said steering handle counterclockwise from said neutral position toward a counterclockwise twisted position causes forward rotation of said right traction element and rearward rotation of said left traction element.

16. The vehicle steering assembly of claim 15, wherein said steering assembly further comprises a plurality of depressible buttons positioned generally below said steering handle, wherein said buttons cooperatively control the speed and direction of rotation of said left and right traction elements.

17. The vehicle steering assembly of claim 16, wherein said steering assembly comprises a plurality of variable switches, wherein each of said variable switches comprises at least one of said depressible buttons, wherein the speed of rotation of said left and right traction elements is determined by how far down said depressible buttons are depressed.

18. The vehicle steering assembly of claim 16, wherein said steering assembly comprising four of the depressible buttons.

19. The vehicle steering assembly of claim 16, wherein said steering handle comprises a base presenting a lower surface having a curved topography, wherein said lower surface is configured to depress said buttons in response to manipulation of said steering handle by an operator of said vehicle.

20. The vehicle steering assembly of claim 15, wherein said steering handle comprises a base presenting a lower surface having a curved topography.

21. The vehicle steering assembly of claim 20, wherein said steering assembly further comprises a plurality of depressible buttons configured to engage said lower surface.

22. The vehicle steering assembly of claim 21, wherein said depressible buttons are upwardly biased, wherein the steering handle is biased toward the neutral position by the depressible buttons.

23. The vehicle steering assembly of claim 15, wherein said steering assembly further comprises a steering controller positioned under said steering handle, wherein said steering controller is configured to communicate with and control movement of a drive train of the vehicle.

24. The vehicle steering assembly of claim 23, wherein said steering controller comprises a hydraulic pilot control valve.

25. The vehicle steering assembly of claim 15, wherein a degree of forward or rearward shifting of said steering handle dictates a respective speed of forward or rearward movement of said vehicle, wherein a degree of twisting of said steering handle dictates a severity of turning of said vehicle.

26. The vehicle steering assembly of claim 15, wherein said steering handle includes only a single upright extension member.

27. The vehicle steering assembly of claim 15, wherein said steering assembly further comprises a handle connection assembly for attaching said steering handle to said panel support structure, where said handle connection assembly comprises a tilt hinge and a twist hinge, wherein said tilt hinge is configured to permit said steering handle to tilt forward and rearward relative to said panel support structure on a tilt axis, wherein said twist hinge is configured to permit said steering handle to twist clockwise and counterclockwise relative to said panel support structure on a twist axis.

28. The vehicle steering assembly of claim 15, wherein the vehicle is a compact utility loader comprising a loader system, a drive system, and a power source for powering the loader system and the drive systems, wherein said left and right traction elements each comprises tracks.

\* \* \* \* \*